United States Patent
Fu

(10) Patent No.: US 12,217,739 B2
(45) Date of Patent: Feb. 4, 2025

(54) SPEECH RECOGNITION METHOD AND APPARATUS, AND COMPUTER-READABLE STORAGE MEDIUM

(71) Applicant: JINGDONG TECHNOLOGY HOLDING CO., LTD., Beijing (CN)

(72) Inventor: Li Fu, Beijing (CN)

(73) Assignee: JINGDONG TECHNOLOGY HOLDING CO., LTD., Beijing (CN)

(*) Notice: Subject to any disclaimer, the term of this patent is extended or adjusted under 35 U.S.C. 154(b) by 234 days.

(21) Appl. No.: 17/760,609

(22) PCT Filed: Apr. 30, 2020

(86) PCT No.: PCT/CN2020/088229
§ 371 (c)(1),
(2) Date: Mar. 15, 2022

(87) PCT Pub. No.: WO2021/057029
PCT Pub. Date: Apr. 1, 2021

(65) Prior Publication Data
US 2022/0343898 A1      Oct. 27, 2022

(30) Foreign Application Priority Data

Sep. 24, 2019  (CN) .......................... 201910904271.2

(51) Int. Cl.
G10L 15/06       (2013.01)
G10L 19/022      (2013.01)
G10L 25/30       (2013.01)

(52) U.S. Cl.
CPC .......... *G10L 15/063* (2013.01); *G10L 19/022* (2013.01); *G10L 25/30* (2013.01)

(58) Field of Classification Search
CPC ..... G10L 15/063; G10L 19/022; G10L 25/30; G10L 15/16; G10L 15/20; G10L 15/02;
(Continued)

(56) References Cited

U.S. PATENT DOCUMENTS 5,475,792 A   12/1995  Stanford et al.
8,438,026 B2   5/2013  Fischer et al.
(Continued)

FOREIGN PATENT DOCUMENTS

CN   101014997 A      8/2007
CN   105513590    *   4/2016
(Continued)

OTHER PUBLICATIONS

"First Office Action and English language translation", CN Application No. 201910904271.2, Jul. 1, 2021, 17 pp.
(Continued)

*Primary Examiner* — Hai Phan
*Assistant Examiner* — Ian Scott McLean
(74) *Attorney, Agent, or Firm* — Myers Bigel, P.A.

(57) ABSTRACT

A speech recognition method, including acquiring first linear frequency spectrums corresponding to audios to be trained with different sampling rates; determining the maximum sampling rate and other sampling rates; determining the maximum frequency domain sequence number of the first linear frequency spectrums as a first frequency domain sequence number and a second frequency domain sequence number; in the first linear frequency spectrums corresponding to the other sampling rate, configuring amplitude values corresponding to each frequency domain sequence number that is greater than the first frequency domain sequence number and less than or equal to the second frequency domain sequence number to be zero to obtain second linear frequency spectrums; determining first speech features and second voice features; and using the first speech features and the second speech features to train a machine learning model.

20 Claims, 11 Drawing Sheets

(58) Field of Classification Search
CPC ......... G10L 15/22; G10L 15/26; G10L 25/18; G10L 25/24
See application file for complete search history.

(56) References Cited

U.S. PATENT DOCUMENTS

| | | | |
|---|---|---|---|
| 10,360,899 | B2 | 7/2019 | Zou et al. |
| 2008/0201139 | A1 | 8/2008 | Yu et al. |
| 2008/0215322 | A1* | 9/2008 | Fischer ................ G10L 15/063 704/E15.01 |
| 2014/0257804 | A1 | 9/2014 | Li et al. |
| 2020/0380954 | A1 | 12/2020 | Fan |

FOREIGN PATENT DOCUMENTS

| | | | | |
|---|---|---|---|---|
| CN | 105513590 | A * | 4/2016 | |
| CN | 106997767 | A | 8/2017 | |
| CN | 107710323 | * | 2/2018 | ........... G10L 19/008 |
| CN | 107710323 | A * | 2/2018 | ........... G10L 19/008 |
| CN | 108510979 | A | 9/2018 | |
| CN | 109061591 | A * | 12/2018 | ............... G01S 7/41 |
| CN | 109346061 | * | 2/2019 | ............. G10L 15/04 |
| CN | 109346061 | A * | 2/2019 | ............. G10L 15/04 |
| CN | 110459205 | A | 11/2019 | |
| EP | 1229519 | A1 | 8/2002 | |

OTHER PUBLICATIONS

"International Search Report and Written Opinion of the International Searching Authority with English language translation", International Application No. PCT/CN2020/088229, Aug. 3, 2020, 17 pp.

Amodei, Dario, et al., "Deep Speech 2: End-to-End Speech Recognition in English and Mandarin", https://arxiv.org/abs/1512.02595v1, Dec. 8, 2015, 28 pp.

Chan, William, et al., Presentation—"Listen, Attend and Spell—A Neural Network for Large Vocabulary Conversational Speech Recognition", Carnegie Mellon University / Google, Sep. 13, 2016, 38 pp.

Gao, Jianqing, et al., "Mixed-Bandwidth Cross-Channel Speech Recognition via Joint Optimization of DNN-Based Bandwidth Expansion and Acoustic Modeling", IEEE/ACM Transactions on Audio, Speech, and Language Processing, vol. 27, Issue 3, Mar. 2019, pp. 559-571.

Graves, Alex, et al., "Speech Recognition With Deep Recurrent Neural Networks", https://arxiv.org/abs/1303.5778v1, Mar. 22, 2013, 5 pp.

Jiangmosson, et al., "Micro Doppler Effects and Applications Thereof", Beijing Aerospace Aviation University Press, Aug. 2013, 13 pp., including concise explanation of the relevance.

Seltzer, Michael L., et al., "Training Wideband Acoustic Models Using Mixed-Bandwidth Training Data for Speech Recognition", IEEE Transactions on Audio, Speech, and Language Processing, Jan. 2007, pp. 235-245.

Shenchen, et al., "Developments and Applications of Cloud Computing-Based Big Data Processing Technology", Electron and Technology University Press, Jan. 2019, 22 pp., including concise explanation of the relevance.

"Communication with Supplementary European Search Report", EP Application No. 20868687.3, Jul. 12, 2023, 7 pp.

Fu, Li, et al., "Research on Modeling Units of Transformer Transducer for Mandarin Speech Recognition", https://arxiv.org/abs/2004.13522, arXiv.org, Cornell University Library, Ithaca, NY, Apr. 26, 2020, 5 pp.

Li, Jinyu, et al., "Improving Wideband Speech Recognition Using Mixed-Bandwidth Training Data in CD-DNN-HMM", 2012 IEEE Spoken Language Technology Workshop (SLT), Miami, Florida, USA, Dec. 2, 2012, pp. 131-136.

Mantena, Gautam, et al., "Bandwidth Embeddings for Mixed-Bandwidth Speech Recognition", https://arxiv.org/abs/1909.02667, arXiv.org, Cornell University Library, Ithaca, NC, Sep. 5, 2019, 6 pp.

Yu, Dong, et al., "Feature Learning in Deep Neural Networks—Studies on Speech Recognition Tasks", https://arxiv.org/abs/1301.3605v1, arXiv.org, Cornell University Library, Ithaca, NY, Jan. 16, 2013, 9 pp.

Yu, Dong, et al., "Feature Learning in Deep Neural Networks—Studies on Speech Recognition Tasks", https://arxiv.org/abs/1301.3605v3, arXiv.org, Cornell University Library, Ithaca, NY, Mar. 8, 2013, 9 pp.

"Notice of Reasons for Refusal" and English language translation, JP Application No. 2022-516702, Jun. 17, 2024, 10 pp.

* cited by examiner

S161: perform Mel-filtering transform on the first linear spectrums corresponding to the maximum sampling rate by using a plurality of unit triangle filters or a plurality of unit square-wave filters, to obtain the first Mel-spectrum features S162: perform global normalization processing on the first Mel-spectrum features to obtain first speech features S171: perform Mel-filtering transform on the second linear spectrums corresponding to the other sampling rate by using a plurality of unit triangle filters or a plurality of unit square-wave filters, to obtain the second Mel-spectrum features S172: perform local normalization processing on the second Mel-spectrum features to obtain the second speech features S1721: according to a maximum linear-spectrum frequency corresponding to the audios of the other sampling rate, acquire a Mel-spectrum frequency corresponding to the maximum linear-spectrum frequency S1722: calculate a maximum Mel-spectrum-filter serial number corresponding to the Mel-spectrum frequency S1723: acquire first amplitude values in the second Mel-spectrum features corresponding to each other Mel-filter serial number S1724: respectively calculate a mean and a standard deviation of each first amplitude value as a local mean and a local standard deviation S1725: calculate a first difference between each of the first amplitude values and the local mean thereof S1726: calculate a ratio of each first difference to the local standard deviation as a normalized first amplitude value corresponding to each first amplitude value S1727: replace each first amplitude value in the second Mel-spectrum features with the normalized first amplitude value corresponding to each first amplitude value

Fig. 12A

SPEECH RECOGNITION METHOD AND APPARATUS, AND COMPUTER-READABLE STORAGE MEDIUM

CROSS-REFERENCE TO RELATED APPLICATIONS

This application is a U.S. National Stage Application under 35 U.S.C. § 371 of International Patent Application No. PCT/CN2020/088229, filed on Apr. 30, 2020, which is based on and claims the priority to the Chinese patent application No. CN201910904271.2 filed on Sep. 24, 2019, the disclosure of both of which are hereby incorporated in its entirety into the present application.

TECHNICAL FIELD

This disclosure relates to the field of machine learning, and in particular, to a speech recognition method and apparatus, and a non-transitory computer-storable medium.

BACKGROUND

In recent years, with the rapid development of artificial intelligence technology, intelligent customer service systems have been widely applied in multiple service fields such as e-commerce, logistics, finance and the like. ASR (Automatic Speech Recognition) is one of core technologies of the intelligent customer service system, which is intended to convert a speech signal of a user into text information for the convenience of subsequent natural language processing. Therefore, accurate and real-time ASR is an important premise for guaranteeing the intelligent customer service system to accurately perform customer intention understanding and service answering. However, in an actual intelligent customer service scene, there may be various complex factors such as accent, dialect, background noise interference and the like in a to-be-recognized audio, which brings a great challenge to high-accuracy speech recognition.

For the speech recognition issue in the intelligent customer service scene, in a conventional method, a machine learning model for the speech recognition is usually decomposed into a plurality of serial sub-models, each sub-model being a machine learning model for realizing part of functions of the speech recognition. In the plurality of serial sub-models, an output of a previous sub-model is an input of a next sub-model. These serial sub-models comprise, but are not limited to, acoustic models, pronunciation dictionary models, and language models. A final machine learning model is obtained through processes such as sub-model design, data annotation, sub-model training and the like.

However, there are mainly the following two problems in the conventional method. Firstly, a large amount of annotation data is needed for training each sub-model, and the more sub-models, the higher time cost and labor cost for acquiring the annotation data. Secondly, the speech recognition performed by using the machine learning model obtained by the plurality of serial sub-models easily results in accumulative transmission of sub-model errors. For example, accuracy of each sub-model is 0.9, and accuracy of a machine learning model obtained by three serial sub-models would be $0.9^3 = 72.9\%$. An application effect of the final machine learning model is severely restricted by adopting the manner of the plurality of serial sub-models.

With the rapid development of DL (Deep Learning) technology, a machine learning model based on an end-to-end DNN (Deep Neural Network) significantly improves its performance, compared with the machine Learning model adopting the plurality of serial sub-models in the conventional method. The DNN-based speech recognition only adopts one machine learning model, an input end of the model being speech audio data, an output end of the model being a text recognition result. Such a model effectively solves, in the machine learning model in the conventional method, problems such as low accuracy of the speech recognition, caused by high sub-model design cost, high annotation cost of data of the plurality of sub-models, and serial accumulation of errors of the plurality of sub-models.

At present, frameworks of the DNN-based machine learning model mainly comprise a CTC (Connectionist Temporal Classification) framework, a LAS (Listen Attention Spell) framework, and an RNNT (Recurrent Neural Network Transducer) framework, and subsequent network structures of the DNN-based machine learning model are evolved on the basis of these three frameworks.

Because a network structure for performing speech recognition by using the machine learning model is usually large, acquiring large-scale audio data and annotation data as training data is an important premise for training a good machine learning model for speech recognition. Therefore, whether the large-scale audio data can be obtained as the training data plays a decisive role in the speech recognition performance of the machine learning model.

However, different from acquiring data such as images and text, audio data involves sensitive information such as privacy and copyright, and it is usually difficult to easily obtain the large-scale audio data. In addition, in a process of acquiring annotation data, it is necessary to listen to the audio data at least once manually to complete the annotation of the audio data, so that annotation cost is high, and it is difficult to obtain large-scale annotation data.

Moreover, even if the large-scale audio data have been obtained, these audio data usually come from different acquisition devices, resulting in that sampling rates of these audio data are not all the same, and it is difficult to apply the audio data with different sampling rates at the same time to the training of the machine learning model.

In view of this, in the method of performing speech recognition by using the machine learning model, audio data with a single sampling rate are adopted, to train and obtain a machine learning model corresponding to the sampling rate. However, since speech feature distributions of the audio data with different sampling rates are different, a machine learning model trained and obtained under one certain speech feature distribution is often difficult to be effectively applied to another speech feature distribution, so that the DNN-based machine learning model trained and obtained by using audio data with one sampling rate has a poor speech recognition effect on audio data with another sampling rate.

In order to train the machine learning model by using larger-scale audio data, in the related art, the audio data with the different sampling rates are subjected to down-sampling or up-sampling, such that after the different sampling rates are converted to a same sampling rate, a speech feature of the audio data is extracted, and then, by using the extracted speech feature, the machine learning model is trained.

SUMMARY

According to a first aspect of the present disclosure, there is provided a speech recognition method, comprising: acquiring first linear spectrums corresponding to to-betrained audios with different sampling rates, wherein an abscissa of the first linear spectrums is a spectrum-sequence serial number, an ordinate of the first linear spectrums is a frequency-domain serial number, and a value of a coordinate point determined by the abscissa and the ordinate is an original amplitude value corresponding to the to-be-trained audios; determining a maximum sampling rate and other sampling rate than the maximum sampling rate in the different sampling rates; determining a maximum frequency-domain serial number of the first linear spectrums corresponding to the other sampling rate as a first frequency-domain serial number; determining a maximum frequency-domain serial number of the first linear spectrums corresponding to the maximum sampling rate as a second frequency-domain serial number; setting, to zero, amplitude values corresponding to each frequency-domain serial number that is greater than the first frequency-domain serial number and less than or equal to the second frequency-domain serial number, in the first linear spectrums corresponding to the other sampling rate, to obtain second linear spectrums corresponding to the other sampling rate; determining first speech features of the to-be-trained audios with the maximum sampling rate according to first Mel-spectrum features of the first linear spectrums corresponding to the maximum sampling rate; determining second speech features of the to-be-trained audios with the other sampling rate according to second Mel-spectrum features of the second linear spectrums corresponding to the other sampling rate; and training a machine learning model by using the first speech features and the second speech features.

In some embodiments, the determining first speech features of the to-be-trained audios with the maximum sampling rate comprises performing global normalization processing on the first Mel-spectrum features to obtain the first speech features; and the determining second speech features of the to-be-trained audios with the other sampling rate comprises performing local normalization processing on the second Mel-spectrum features to obtain the second speech features.

In some embodiments, the local normalization processing comprises: according to a maximum linear-spectrum frequency corresponding to the to-be-trained audios with the other sampling rate, acquiring a Mel-spectrum frequency corresponding to the maximum linear-spectrum frequency; calculating a maximum Mel-filter serial number corresponding to the Mel-spectrum frequency; acquiring first amplitude values corresponding to each other Mel-filter serial number in the second Mel-spectrum features, the other Mel-filter serial number being a Mel-filter serial number less than or equal to the maximum Mel-filter serial number; respectively calculating a mean and a standard deviation of all first amplitude values as a local mean and a local standard deviation; calculating a first difference between each of the first amplitude values and the local mean thereof; calculating a ratio of each first difference to the local standard deviation as a normalized first amplitude value corresponding to each first amplitude value; and replacing each first amplitude value in the second Mel-spectrum features with the normalized first amplitude value corresponding to each first amplitude value.

In some embodiments, the global normalization processing comprises: acquiring second amplitude values corresponding to each Mel-filter serial number in the first Mel-spectrum features; calculating a mean and a standard deviation of all second amplitude values as a global mean and a global standard deviation; calculating a second difference between each of the second amplitude values and the global mean thereof; calculating a ratio of each second difference to the global standard deviation as a normalized second amplitude value corresponding to each second amplitude value; and replacing each second amplitude value in the first Mel-spectrum features with the normalized second amplitude value corresponding to each second amplitude value.

In some embodiments, the acquiring first linear spectrums corresponding to to-be-trained audios with different sampling rates comprises: respectively acquiring the first linear spectrums corresponding to the to-be-trained audios with the different sampling rates by using short-time Fourier transform.

In some embodiments, the acquiring first linear spectrums corresponding to to-be-trained audios with different sampling rates comprises: acquiring speech signal oscillograms of the to-be-trained audios with the different sampling rates; respectively performing pre-emphasis processing on the speech signal oscillograms of the to-be-trained audios with the different sampling rates; and acquiring the first linear spectrums corresponding to the to-be-trained audios with the different sampling rates according to the speech signal oscillograms after the pre-emphasis processing.

In some embodiments, the speech recognition method further comprises: respectively performing Mel-filtering transform on the first linear spectrums corresponding to the maximum sampling rate and the second linear spectrums corresponding to the other sampling rate by using a plurality of unit triangle filters, to obtain the first Mel-spectrum features and the second Mel-spectrum features.

In some embodiments, the machine learning model comprises a deep neural network (DNN) model.

In some embodiments, the different sampling rates comprise 16 kHZ and 8 kHZ.

In some embodiments, the speech recognition method further comprises: acquiring a to-be-recognized audio; determining a speech feature of the to-be-recognized audio; and inputting the speech feature of the to-be-recognized audio into the machine learning model, to obtain a speech recognition result.

In some embodiments, the determining a speech feature of the to-be-recognized audio comprises: determining a maximum frequency-domain serial number of a first linear spectrum of the to-be-recognized audio as a third frequency-domain serial number; setting, to zero, amplitude values corresponding to each frequency-domain serial number that is greater than the third frequency-domain serial number and less than or equal to the second frequency-domain serial number, in the first linear spectrum of the to-be-recognized audio, to obtain a second linear spectrum of the to-be-recognized audio; and determining the speech feature of the to-be-recognized audio according to a Mel-spectrum feature of the second linear spectrum of the to-be-recognized audio.

According to a second aspect of the present disclosure, there is provided a speech recognition apparatus, comprising: a first acquisition module configured to acquire first linear spectrums corresponding to to-be-trained audios with different sampling rates, wherein an abscissa of the first linear spectrums is a spectrum-sequence serial number, an ordinate of the first linear spectrums is a frequency-domain serial number, and a value of a coordinate point determined by the abscissa and the ordinate is an original amplitude value corresponding to the to-be-trained audios; a first determination module configured to determine a maximum sampling rate and other sampling rate than the maximum sampling rate in the different sampling rates; a second determination module configured to determine a maximum frequency-domain serial number of the first linear spectrums corresponding to the other sampling rate as a first frequency-domain serial number; a third determination module configured to determine a maximum frequency-domain serial number of the first linear spectrums corresponding to the maximum sampling rate as a second frequency-domain serial number; a setting module configured to set, to zero, amplitude values corresponding to each frequency-domain serial number that is greater than the first frequency-domain serial number and less than or equal to the second frequency-domain serial number, in the first linear spectrums corresponding to the other sampling rate, to obtain second linear spectrums corresponding to the other sampling rate; a fourth determination module configured to determine first speech features of the to-be-trained audios with the maximum sampling rate according to first Mel-spectrum features of the first linear spectrums corresponding to the maximum sampling rate; a fifth determination module configured to determine second speech features of the to-be-trained audios with the other sampling rate according to second Mel-spectrum features of the second linear spectrums corresponding to the other sampling rate; and a training module configured to train a machine learning model by using the first speech features and the second speech features.

According to a third aspect of the present disclosure, there is provided a speech recognition apparatus, comprising: a memory; and a processor coupled to the memory, the processor being configured to perform, based on instructions stored in the memory, the speech recognition method according to any of the above embodiments.

According to a fourth aspect of the present disclosure, there is provided a non-transitory computer-storable medium having stored thereon computer program instructions which, when executed by a processor, implement the speech recognition method according to any of the embodiments.

BRIEF DESCRIPTION OF THE DRAWINGS

The accompanying drawings, which constitute a part of this specification, illustrate embodiments of the present disclosure and, together with the description, serve to explain the principles of the present disclosure.

The present disclosure can be more clearly understood from the following detailed description made in conjunction with the accompanying drawings, in which:

FIG. 12A is a flow diagram illustrating local normalization processing according to some embodiments of the present disclosure;

DETAILED DESCRIPTION

Figure 1:
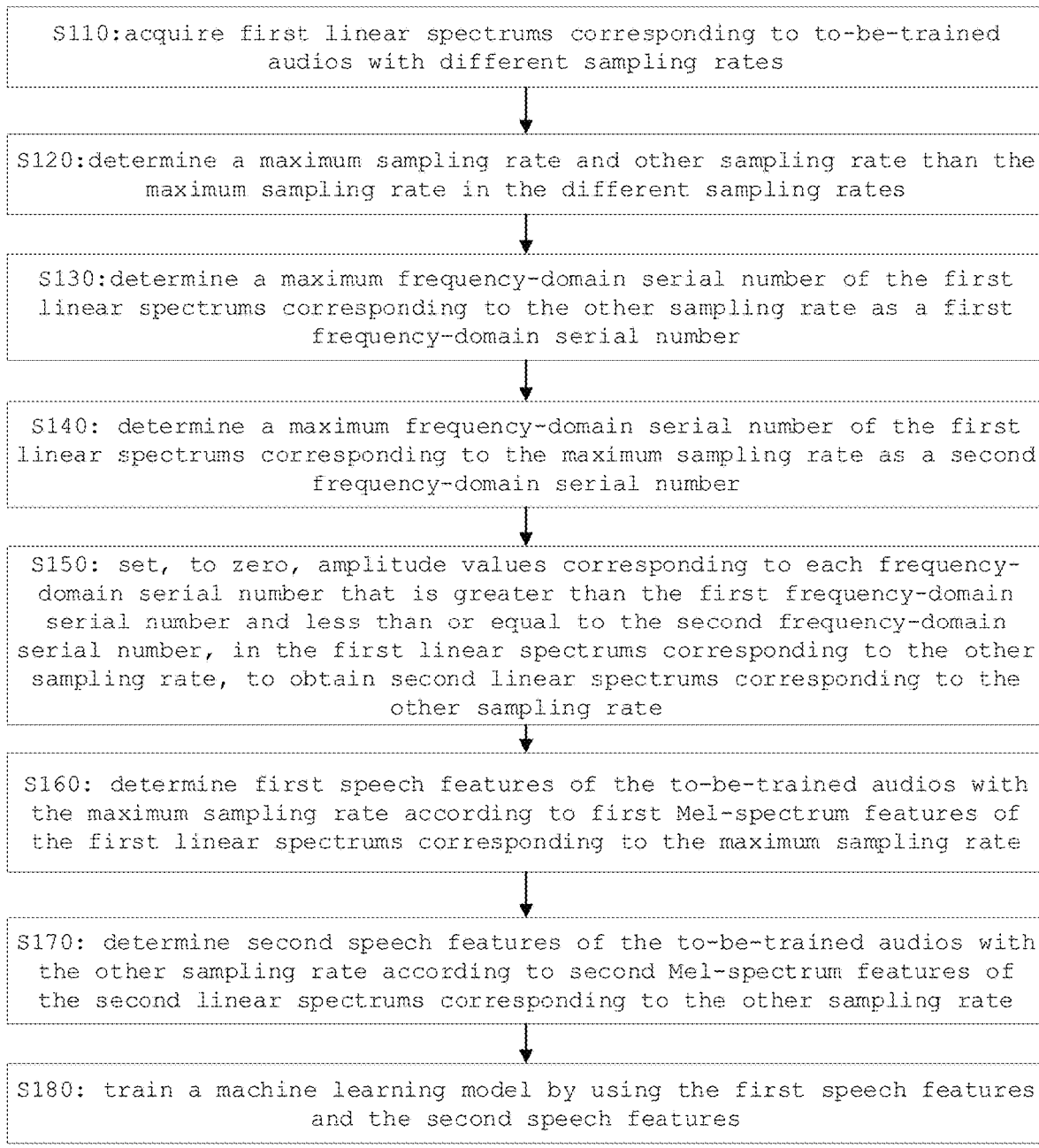
FIG. 1 is a flow diagram illustrating a speech recognition method according to some embodiments of the present disclosure.

Various exemplary embodiments of the present disclosure will now be described in detail with reference to the accompanying drawings. It should be noted that: relative arrangements of components and steps, numerical expressions and numerical values set forth in these embodiments do not limit the scope of the present disclosure unless specifically stated otherwise.

Meanwhile, it should be understood that sizes of various portions shown in the drawings are not drawn to an actual scale for ease of description.

The following description of at least one exemplary embodiment is merely illustrative in nature and is in no way intended to limit this disclosure, its application, or uses.

A technique, method, and apparatus known to one of ordinary skill in the related art may not be discussed in detail but should be considered as part of the specification where appropriate.

In all examples shown and discussed herein, any specific value should be construed as exemplary only and not as limiting. Therefore, other examples of an exemplary embodiment can have different values.

It should be noted that: similar reference numbers and letters refer to similar items in the following drawings, and therefore, once a certain item is defined in one drawing, it need not be discussed further in subsequent drawings.

In the related art, a large amount of original audio data information will be lost in down-sampling, and other audio data information will be inserted in up-sampling, so that original speech features of audio data with different sampling rates cannot be accurately extracted, therefore, it is difficult to improve speech recognition performance of a machine learning model.

In view of this, in the present disclosure, a speech recognition method is provided to accurately extract the original speech features of the audio data with different sampling rates, thereby improving the speech recognition performance of the machine learning model.

FIG. 1 is a flow diagram illustrating a speech recognition method according to some embodiments of the present disclosure.

As shown in FIG. 1, the speech recognition method comprises steps S110 to S180. For example, the speech recognition method is performed by a speech recognition apparatus.

In step S110, first linear spectrums corresponding to to-be-trained audios with different sampling rates are acquired. An abscissa of the first linear spectrums is a spectrum-sequence serial number, and an ordinate thereof is a frequency-domain serial number. A value of a coordinate point determined by the abscissa and the ordinate of the first linear spectrums is an original amplitude value corresponding to the to-be-trained audios. In some embodiments, each kind of sampling rate corresponds to multiple audios to be trained, and each audio corresponds to one first linear spectrum.

The different sampling rates comprise, for example, 16 kHZ and 8 kHZ. That is, the to-be-trained audios comprise the audios with the sampling rate of 16 kHZ and the audios with the sampling rate of 8 kHZ. It should be understood that the present disclosure only take most common sampling rates of 16 kHZ and 8 kHZ as examples, but the sampling rates can also comprise other sampling rates such as 44.1 kHZ, 50 kHZ, etc.

In some embodiments, the sampling rate is denoted by s, and $s \in [1, 2]$. $s \in [1, 2]$ denotes that the sampling rate s has a value of 1 or 2. Under the condition that the sampling rate s has the value of 1, the sampling rate of the to-be-trained audios is 8 kHZ. Under the condition that the sampling rate s has the value of 2, the sampling rate of the to-be-trained audios is 16 kHZ.

For example, the to-be-trained audios with a same sampling rate can be a plurality of audios. In some embodiments, the number of to-be-trained audios with the sampling rate of 8 kHZ is $N_1$, where $N_1$ is a positive integer. The number of to-be-trained audios with the sampling rate of 16 kHZ is $N_2$, where $N_2$ is a positive integer.

In some embodiments, the first linear spectrums corresponding to the to-be-trained audios with the different sampling rates are respectively acquired by using short-time Fourier transform (STFT). For example, a time-domain feature of an audio can be transformed into a frequency-domain feature by using the short-time Fourier transform. In the field of speech recognition, the frequency-domain feature has a better speech feature representation, and different speech features are more easily distinguished in the spectrum. Therefore, transforming the time-domain feature of the to-be-trained audio into the frequency-domain feature is more beneficial to the training of the machine learning model.

Figure 2:
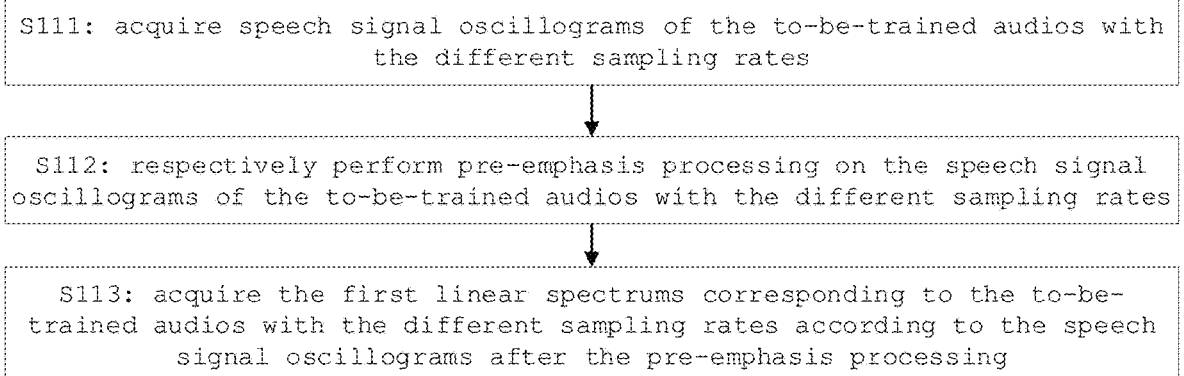
FIG. 2 is a flow diagram illustrating acquiring first linear spectrums corresponding to to-be-trained audios with different sampling rates according to some embodiments of the present disclosure.

In some embodiments, the acquiring first linear spectrums corresponding to to-be-trained audios with different sampling rates in the step S110 of FIG. 1 can also be implemented in a manner as shown in FIG. 2.

FIG. 2 is a flow diagram illustrating acquiring first linear spectrums corresponding to to-be-trained audios with different sampling rates according to some embodiments of the present disclosure.

As shown in FIG. 2, the acquiring first linear spectrums corresponding to to-be-trained audios with different sampling rates comprises steps S111 to S113.

In the step S111, speech signal oscillograms of the to-be-trained audios with the different sampling rates are acquired. The speech signal oscillogram represents a time-domain feature of the audio.

For example, speech signal oscillograms of to-be-trained audios with sampling rates of 8 kHZ and 16 kHZ are acquired respectively.

The speech signal oscillograms of the to-be-trained audios with the sampling rates of 8 kHZ and 16 kHZ will be described in detail below in conjunction with FIGS. 3A and 3B.

Figure 3A:
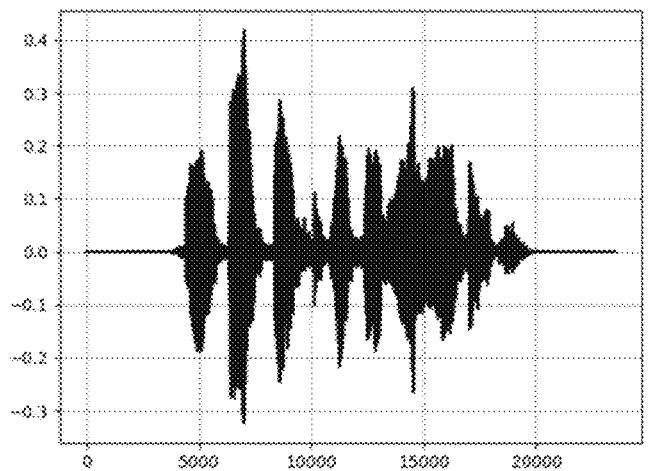
FIG. 3A illustrates a speech signal oscillogram of a to-be-trained audio with a sampling rate of 8 kHZ according to some embodiments of the present disclosure.

FIG. 3A illustrates a speech signal oscillogram of a to-be-trained audio with a sampling rate of 8 kHZ according to some embodiments of the present disclosure.

As shown in FIG. 3A, an abscissa of the speech signal oscillogram of the to-be-trained audio with the sampling rate of 8 kHZ is a sampling-point serial number, and an ordinate thereof is a normalized amplitude value of the speech signal. The speech signal oscillogram shown in FIG. 3A represents a discrete speech signal of the to-be-trained audio with the sampling rate of 8 kHZ in a visualization form.

In some embodiments, the discrete speech signal of the speech signal oscillogram of the to-be-trained audio with the sampling rate of 8 kHZ shown in FIG. 3A can be denoted as $l_i^1$, where $i \in [1, N_1]$. 1 in $l_i^1$ is the value of the sampling rate s.

For example, a sampling-point serial number of the discrete speech signal of the speech signal oscillogram of FIG. 3A is denoted by k. $k \in [1, K_i^1]$, where $K_i^1$ is not only a total number of sampling points of the discrete speech signal $l_i^1$, but also a maximum value of sampling-point serial numbers. In some embodiments, each sampling point corresponds to one sampling time moment, so that $K_i^1$ also denotes a total number of the sampling time moments.

For example, an amplitude value of a kth sampling point in the discrete speech signal $l_i^1$ of the speech signal oscillogram of the to-be-trained audio with the sampling rate of 8 kHZ shown in FIG. 3A can be denoted as $l_i^1(k)$.

Figure 3B:
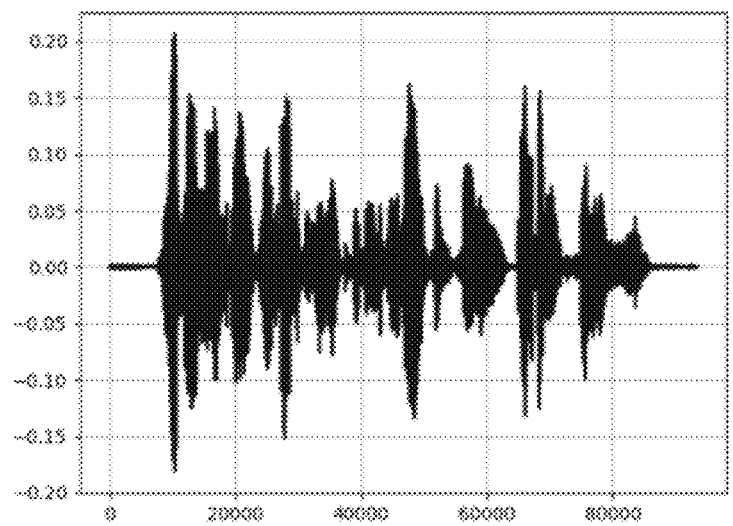
FIG. 3B illustrates a speech signal oscillogram of a to-be-trained audio with a sampling rate of 16 kHZ according to some embodiments of the present disclosure.

FIG. 3B illustrates a speech signal oscillogram of a to-be-trained audio with a sampling rate of 16 kHZ according to some embodiments of the present disclosure.

As shown in FIG. 3B, an abscissa of the speech signal oscillogram of the to-be-trained audio with the sampling rate of 16 kHZ is a sampling-point serial number, and an ordinate thereof is a normalized amplitude value of the speech signal. The speech signal oscillogram shown in FIG. 3B represents a discrete speech signal of the to-be-trained audio with the sampling rate of 16 kHZ in a visualization form.

In some embodiments, the discrete speech signal of the speech signal oscillogram of the to-be-trained audio with the sampling rate of 16 kHZ shown in FIG. 3B can be denoted as $l_j^2$, where $j \in [1, N_2]$. 2 in $l_j^2$ is the value of the sampling rate s.

For example, a sampling-point serial number of the discrete speech signal of the speech signal oscillogram of FIG. 3B is denoted by k'. k'∈[1, $K_j^2$], where $K_j^2$ is not only a total number of sampling points of the discrete speech signal $l_j^2$, but also a maximum value of sampling-point serial numbers. In some embodiments, each sampling point corresponds to one sampling time moment, so that $K_j^2$ also denotes a total number of the sampling time moments.

For example, an amplitude value of a k'th sampling point in the discrete speech signal $l_j^2$ of the speech signal oscillogram of the to-be-trained audio with the sampling rate of 16 kHZ shown in FIG. 3B can be denoted as $l_j^2(k')$.

Returning to FIG. 2, after the speech signal oscillograms of the to-be-trained audios with different sampling rates are acquired, step S112 is executed. In the step S112, pre-emphasis processing is respectively performed on the speech signal oscillograms of the to-be-trained audios with the different sampling rates. The speech signal oscillogram after the pre-emphasis processing still represents the time-domain feature of the audio. By performing pre-emphasis processing on the speech signal, a signal-to-noise ratio of the speech signal is improved, a high-frequency resolution of the speech is increased, and the speech feature of the original to-be-trained audio is better restored.

For example, the pre-emphasis processing is respectively performed on the speech signal oscillograms of the audios with the sampling rates of 8 kHZ and 16 kHZ.

Speech signal oscillograms after the pre-emphasis processing performed on the speech signal oscillograms of the to-be-trained audios with the sampling rates of 8 KHZ and 16 KHZ in FIGS. 3A and 3B will be described in detail below in conjunction with FIGS. 4A and 4B.

Figure 4A:
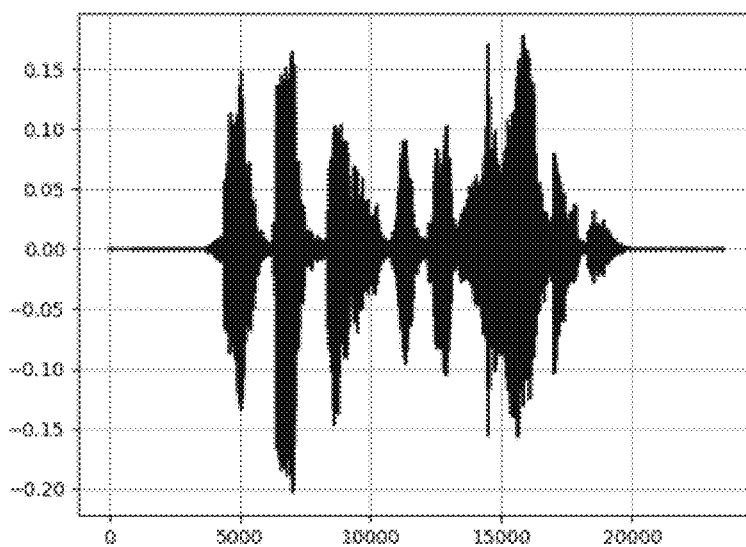
FIG. 4A illustrates a speech signal oscillogram of a to-be-trained audio with a sampling rate of 8 kHZ after pre-emphasis processing according to some embodiments of the present disclosure.

FIG. 4A illustrates a speech signal oscillogram of a to-be-trained audio with a sampling rate of 8 kHZ after pre-emphasis processing according to some embodiments of the present disclosure.

As shown in FIG. 4A, an abscissa of the speech signal oscillogram of the to-be-trained audio with the sampling rate of 8 kHZ after the pre-emphasis processing is a sampling-point serial number, and an ordinate thereof is a normalized amplitude value after the pre-emphasis processing.

For example, a discrete speech signal of the speech signal oscillogram after the pre-emphasis processing shown in FIG. 4A can be denoted as $p_i^1 = l_i^1(k) - \alpha l_i^1(k-1)$. $\alpha$ is a pre-emphasis weight, and $0 < \alpha < 1$. For example, $\alpha = 0.97$.

Figure 4B:
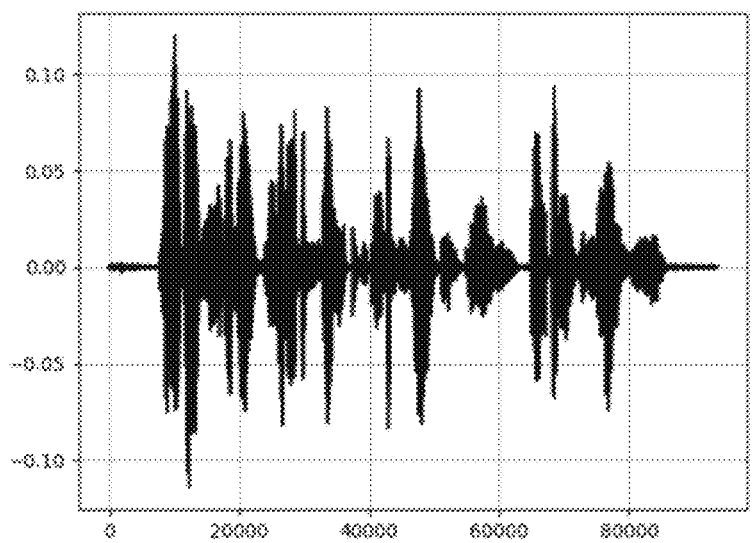
FIG. 4B illustrates a speech signal oscillogram of a to-be-trained audio with a sampling rate of 16 kHZ after pre-emphasis processing according to some embodiments of the present disclosure.

FIG. 4B illustrates a speech signal oscillogram of a to-be-trained audio with a sampling rate of 16 kHZ after pre-emphasis processing according to some embodiments of the present disclosure.

As shown in FIG. 4B, an abscissa of the speech signal oscillogram of the to-be-trained audio with the sampling rate of 16 kHZ after the pre-emphasis processing is a sampling-point serial number, and an ordinate thereof is a normalized amplitude value after the pre-emphasis processing.

For example, a discrete speech signal of the speech signal oscillogram after the pre-emphasis processing shown in FIG. 4B can be denoted as $p_j^2 = l_j^2(k') - \alpha' l_j^2(k'-1)$. $\alpha'$ is a pre-emphasis weight, and $0 < \alpha' < 1$. For example, $\alpha' = 0.97$.

Returning to FIG. 2, after the pre-emphasis processing is performed on the speech signal oscillograms of the to-be-trained audios with the different sampling rates, step S113 is executed. In the step S113, the first linear spectrums corresponding to the to-be-trained audios with the different sampling rates are acquired according to the speech signal oscillograms after the pre-emphasis processing. For example, according to the speech signal oscillograms after the pre-emphasis processing shown in FIGS. 4A and 4B, the first linear spectrums corresponding to the to-be-trained audios with the sampling rates of 8 kHZ and 16 kHZ are acquired.

In some embodiments, the discrete speech signals of the speech signal oscillograms after the pre-emphasis processing shown in FIGS. 4A and 4B are denoted as $p_i^1$ and $p_j^2$, respectively. For example, the discrete speech signals $p_i^1$ and $p_j^2$ of the speech signal oscillograms after the pre-emphasis processing shown in FIGS. 4A and 4B are respectively subjected to the short-time Fourier transform, to obtain the first linear spectrums $L_i^1$ and $L_j^2$ corresponding to the to-be-trained audios with the sampling rates of 8 kHZ and 16 kHZ. For example, by using short-time Fourier transform formulas $L_i^1 = F(p_i^1, n_1)$ and $L_j^2 = F(p_j^2, n_2)$, $n_1$-point short-time Fourier transform and $n_2$-point short-time Fourier transform are performed on the discrete speech signals $p_i^1$ and $p_j^2$, respectively.

For example, a size of a sliding window of the SIFT is 20 ms, and a sliding stride of the sliding window is 10 ms. It should be understood that the sliding stride of the windows is only required to ensure a certain overlapping area between sliding windows.

In some embodiments, the discrete speech signals after the pre-emphasis processing performed on the to-be-trained audios with sampling rates of 8 kHZ and 16 kHZ have, in the sliding window of 20 ms, 20 ms×8 kHZ=160 points and 20 ms×16 kHZ=320 points, respectively. Values of $n_1$ and $n_2$ must be an exponent of 2 in order to realize parallel processing and improve the processing speed. However, minimum numbers that are greater than 160 and 320 in the exponents of 2 are 256 and 512, respectively. Therefore, $n_1 = 256$, and $n_2 = 512$.

According to $n_1$ and $n_2$ calculated, the discrete speech signals after the pre-emphasis processing performed on the to-be-trained audios with the sampling rates of 8 kHz and 16 kHz can be respectively subjected to 256-point STFT and 512-point STFT.

According to a sampling theorem, the to-be-trained audio with the sampling rate of 8 kHz can only have spectrum information of 4 kHz at most, and the 256-point STFT is to divide −4 kHz to 4 kHz into 256 parts evenly. By combining a positive frequency 4 kHZ and a negative frequency −4 kHZ, an obtained dimension of the spectrum sequence is 256÷2+1=129.

Through the 256-point STFT, a 129-dimension spectrum sequence of each discrete speech signal with the sampling rate of 8 kHz can be obtained, as the first linear spectrum of the to-be-trained audio with the sampling rate of 8 kHz.

Figure 5A:
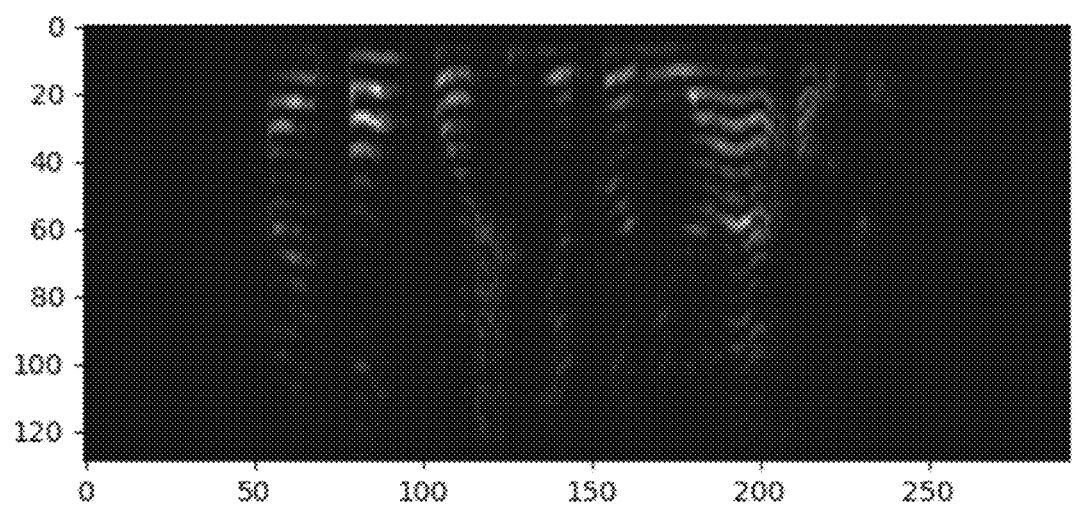
FIG. 5A illustrates a first linear spectrum corresponding to a to-be-trained audio with a sampling rate of 8 kHZ according to some embodiments of the present disclosure.

FIG. 5A illustrates a first linear spectrum corresponding to a to-be-trained audio with a sampling rate of 8 kHZ according to some embodiments of the present disclosure.

As shown in FIG. 5A, an abscissa of the first linear spectrum corresponding to the to-be-trained audio with the sampling rate of 8 kHZ is a spectrum-sequence serial number, and an ordinate thereof is a frequency-domain serial number. A value of a coordinate point determined by the abscissa and the ordinate is an amplitude value corresponding to the to-be-trained audio with the sampling rate of 8 kHZ. Each frequency-domain serial number corresponds to one frequency range.

For example, a linear-spectrum frequency range of the to-be-trained audio with the sampling rate of 8 kHZ is 0 to 4 kHZ, frequency-domain serial numbers of the first linear spectrum corresponding to the to-be-trained audio with the sampling rate of 8 kHZ are 0 to 128, that is, 0 to 4 kHZ is divided into 128 segments, and each frequency-domain serial number corresponds to one linear-spectrum frequency range.

According to FIG. 4B, it can be seen that a maximum sampling-point serial number of the discrete speech signal after the pre-emphasis processing is 20000, that is, the to-be-trained audio of 8 kHZ has 20000 sampling points in total. 8 kHZ indicates 8000 sampling points per second, then a total duration of the audio of 8 kHZ having 20000 sampling points is 20000/8000=2.5 seconds, i.e. 2500 milliseconds.

For example, a stride of the sliding window is 10 milliseconds, and the number of sliding strides is 2500/10-1=249 strides. Therefore, spectrum-sequence serial numbers of the first linear spectrum corresponding to the to-be-trained audio with the sampling rate of 8 kHZ are 0 to 248. The frequency-domain serial numbers are 0 to 128. Each spectrum-sequence serial number and each frequency-domain serial number uniquely determine one amplitude value. 129 amplitude values corresponding to each spectrum-sequence serial number constitute a spectrum sequence corresponding to the spectrum-sequence serial numbers. Similarly, through the 512-point STFT, a 257-dimension spectrum sequence of each discrete speech signal with the sampling rate of 16 kHz can be obtained, as the first linear spectrum of the to-be-trained audio with the sampling rate of 16 kHZ.

Figure 5B:
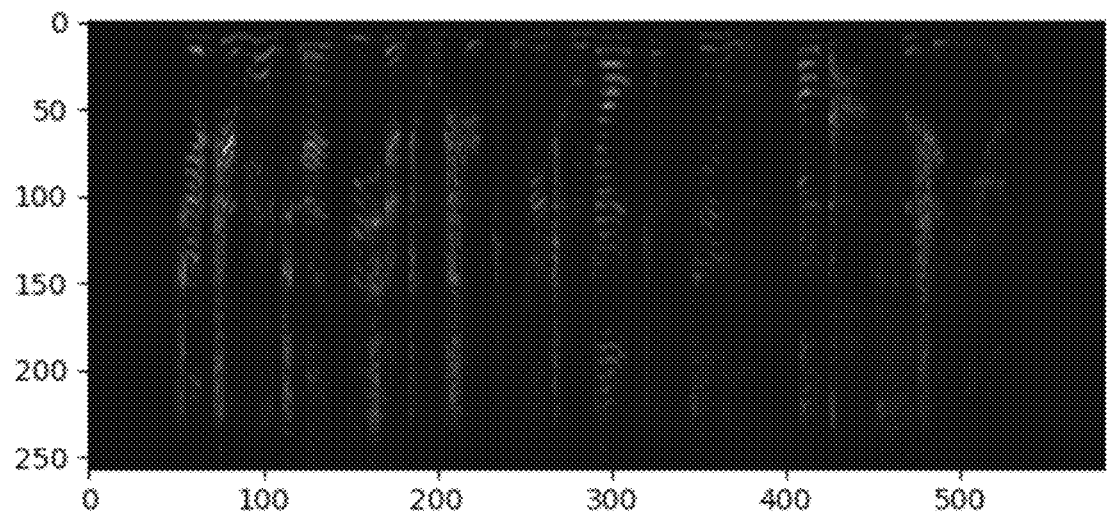
FIG. 5B illustrates a first linear spectrum corresponding to a to-be-trained audio with a sampling rate of 16 kHZ according to some embodiments of the present disclosure.

FIG. 5B illustrates a first linear spectrum corresponding to a to-be-trained audio with a sampling rate of 16 kHZ according to some embodiments of the present disclosure.

As shown in FIG. 5B, an abscissa of the first linear spectrum corresponding to the to-be-trained audio with the sampling rate of 16 kHZ is a spectrum-sequence serial number, and an ordinate thereof is a frequency-domain serial number. A value of a coordinate point determined by the abscissa and the ordinate is an amplitude value corresponding to the audio with the sampling rate of 16 kHZ. Spectrum-sequence serial numbers of the first linear spectrum corresponding to the to-be-trained audio with the sampling rate of 16 kHZ are 0 to 498, and frequency-domain serial numbers are 0-256. Each spectrum-sequence serial number and each frequency-domain serial number uniquely determine one amplitude value. 257 amplitude values corresponding to each spectrum-sequence serial number constitute a spectrum sequence corresponding to the spectrum-sequence serial numbers.

Returning to FIG. 1, after the first linear spectrums corresponding to the to-be-trained audios with the different sampling rates are acquired, step S120 is performed. In the step S120, a maximum sampling rate and other sampling rate than the maximum sampling rate in the different sampling rates are determined. For example, taking the to-be-trained audios with the different sampling rates of 8 kHZ and 16 kHZ as examples, the maximum sampling rate is 16 kHZ, and the other sampling rate is 8 kHZ.

In step S130, a maximum frequency-domain serial number of the first linear spectrums corresponding to the other sampling rate is determined as a first frequency-domain serial number. In some embodiments, a maximum frequency-domain serial number of the first linear spectrums corresponding to 8 kHZ is determined as a first frequency-domain serial number. For example, taking the to-be-trained audios with the different sampling rates of 8 kHZ and 16 kHZ as examples, according to FIG. 5A, the first frequency-domain serial number is 128.

In step S140, a maximum frequency-domain serial number of the first linear spectrums corresponding to the maximum sampling rate is determined as a second frequency-domain serial number. In some embodiments, a maximum frequency-domain serial number of the first linear spectrums corresponding to 16 kHZ is determined as the second frequency-domain serial number. For example, taking the to-be-trained audios with the different sampling rates of 8 kHZ and 16 kHZ as examples, according to FIG. 5B, the second frequency-domain serial number is 256.

In step S150, amplitude values corresponding to each frequency-domain serial number that is greater than the first frequency-domain serial number and less than or equal to the second frequency-domain serial number, in the first linear spectrums corresponding to the other sampling rate, are set to zero, to obtain second linear spectrums corresponding to the other sampling rate.

Figure 6:
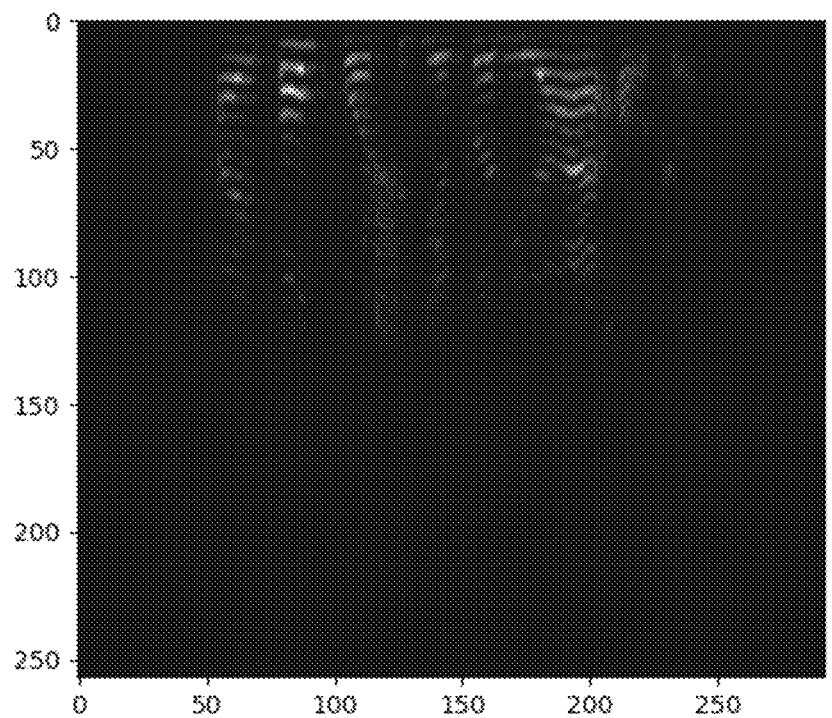
FIG. 6 illustrates a second linear spectrum corresponding to a to-be-trained audio with a sampling rate of 8 kHZ according to some embodiments of the present disclosure.

For example, in FIG. 5A, amplitude values corresponding to each frequency-domain serial number that is greater than 128 and less than or equal to 256 are set to zero, to obtain a second linear spectrum corresponding to 8 kHZ as shown in FIG. 6. The number of frequency-domain serial numbers of the second linear spectrum is the same as the number of the frequency-domain serial numbers of the first linear spectrum corresponding to 16 kHz, so that mixed training can be performed on the machine learning model by using the to-be-trained audios with the different sampling rates.

FIG. 6 illustrates a second linear spectrum corresponding to a to-be-trained audio with a sampling rate of 8 kHZ according to some embodiments of the present disclosure.

As shown in FIG. 6, an abscissa of the second linear spectrum corresponding to the to-be-trained audio with the sampling rate of 8 kHZ is a spectrum-sequence serial number, and an ordinate thereof is a frequency-domain serial number. A value of a coordinate point determined by the abscissa and the ordinate is an amplitude value corresponding to the audio with the sampling rate of 8 kHZ.

Compared with FIG. 5A, in FIG. 6, amplitude values corresponding to frequency-domain serial numbers 129 to 255 are added, and the amplitude values are all 0. Zero-padding does not destroy original spectrum information of the audio, and does not destroy an original speech feature. Since the zero-padding is performed on the first linear spectrum corresponding to the audio of 8 kHZ, frequency ranges of the second linear spectrum of the to-be-trained audio of 8 kHZ and the first linear spectrum of the to-be-trained audio of 16 kHZ are both 0 to 8 kHZ.

Returning to FIG. 1, after the second linear spectrums corresponding to the other sampling rate is obtained, step S160 is performed. In the step S160, first speech features of the to-be-trained audios with the maximum sampling rate is determined according to first Mel-spectrum features of the first linear spectrums corresponding to the maximum sampling rate. The Mel-spectrum feature is also called a Mel spectrogram.

Figures 7, 8:
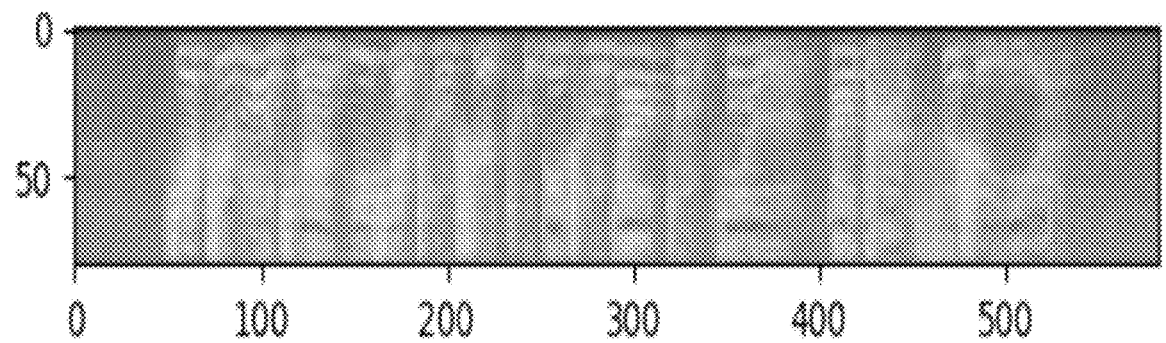
FIG. 7 is a flow diagram illustrating determining first speech features of a to-be-trained audios with a maximum sampling rate according to some embodiments of the present disclosure.
FIG. 8 illustrates a first Mel-spectrum feature of a first linear spectrum corresponding to 16 kHZ according to some embodiments of the present disclosure.

FIG. 7 is a flow diagram illustrating determining first speech features of a to-be-trained audios with a maximum sampling rate according to some embodiments of the present disclosure.

As shown in FIG. 7, the determining first speech features of to-be-trained audios with a maximum sampling rate comprises steps S161 to S162.

In the step S161, Mel-filtering transform is performed on the first linear spectrums corresponding to the maximum sampling rate by using a plurality of unit triangle filters or a plurality of unit square-wave filters, to obtain the first Mel-spectrum features. The unit triangle filter and the unit square-wave filter are both linear Mel-filters.

It should be understood by those skilled in the art that the Mel-spectrum feature is another spectrum feature obtained by filtering and transforming a linear-spectrum feature. Through the Mel-filtering transform, transforming the linear-spectrum feature into the Mel-spectrum feature is transforming the linear-spectrum feature into a log linear spectrum. In the speech recognition, however, due to difference features of high and low frequencies, it is generally considered that speech information of a low-frequency part is richer than that of a high-frequency part. The Mel-spectrum feature obtained by performing Mel-filtering transform on the linear spectrum causes higher resolution of the Mel spectrum corresponding to the low-frequency part of the audio and relatively lower resolution of the Mel spectrum corresponding to the high-frequency part, which is more beneficial to the extraction of the speech feature in the process of the speech recognition. Here, the high frequency and low frequency are relative concepts, i.e. frequencies higher than the low frequency are all high frequencies. For example, if 0 to 2 kHz are low frequencies, frequencies greater than 2 kHz are high frequencies.

In some embodiments, a mapping relation between a Mel-spectrum frequency and a linear-spectrum frequency is:

$$m = 2595 \log_{10}\left(1 + \frac{f}{700}\right) \text{ or }$$

$$f = 700(10^{m/2595} - 1).$$

f is the linear-spectrum frequency and m is the Mel-spectrum frequency.

In some embodiments, by designing the number of linear Mel-filters, a Mel-spectrum feature of a corresponding dimension feature can be obtained. For example, by using a plurality of unit triangle filters, Mel-filtering transform is performed on the first linear spectrum corresponding to the maximum sampling rate. In some embodiments, the number of unit triangle filters is 80.

For example, by using a formula $$H_n(g) = \begin{cases} 0 & g < f(m_{n-1}) \\ \frac{g - f(m_{n-1})}{f(m_n) - f(m_{n-1})} & f(m_{n-1}) \le g < f(m_n) \\ 1 & g = f(m_n) \\ \frac{f(m_{n+1}) - g}{f(m_{n+1}) - f(m_n)} & f(m_n) < g \le f(m_{n+1}) \\ 0 & g > f(m_{n+1}) \end{cases},$$

each unit triangle filter is calculated. $H_n(g)$ denotes an nth unit triangle filter. n is an integer greater than or equal to 1 and less than or equal to 80. $m_n$ is a center frequency of each unit triangle filter. g is a linear-spectrum frequency. $f(m_n)$ is a linear-spectrum frequency corresponding to the center frequency $m_n$. For example, $f(m_n)$ is calculated with a formula $f=700(10^{m/2595}-1)$.

The calculation process of the center frequency $m_n$ of each unit triangle filter in some embodiments of the present disclosure will be described in detail below.

For example, a linear-spectrum frequency corresponding to the maximum Mel-spectrum frequency of each unit triangle filter is 8 kHZ, i.e., $$m_{max} = 2595 \times \log_{10}\left(1 + \frac{8000}{700}\right) = 2840.$$

A bandwidth of each unit triangle filter is $$m_c = \frac{m_{max}}{80} = 35.5.$$

The center frequency of each unit triangle filter is $$m_n = \frac{m_c}{2} + m_c \times (n - 1) = 17.75 + 35.5 \times (n - 1).$$

For example, for the audio with the sampling rate of 16 kHZ, after the unit triangle filters $H_n(g)$ are calculated, the Mel-filtering transform is performed on the first linear spectrum shown in FIG. 5B by using the 80 unit triangle filters, $H_1(g)$ to $H_n(g)$. For example, by using a Mel-filtering transform formula $\Phi_j^2 = L_j^2 \times [H_1(g), \ldots, H_n[g]]$, a first Mel-spectrum feature as shown in FIG. 8 is calculated. $\Phi_j^2$ is a matrix of second amplitude values in the first Mel-spectrum feature.

FIG. 8 illustrates a first Mel-spectrum feature of a first linear spectrum corresponding to 16 kHZ according to some embodiments of the present disclosure.

As shown in FIG. 8, an abscissa of the first Mel-spectrum feature of the first linear spectrum corresponding to the to-be-trained audio with the sampling rate of 16 kHZ is a spectrum-sequence serial number, which is the same as the spectrum-sequence serial number of the first linear spectrum. An ordinate of the first Mel-spectrum feature is a Mel-filter serial number. A value of a coordinate point determined by the abscissa and the ordinate is a second amplitude value corresponding to the to-be-trained audio with the sampling rate of 16 kHZ.

Returning to FIG. 7, after the first Mel-spectrum feature is obtained, execution of step S162 is continued. In the step S162, global normalization processing is performed on the first Mel-spectrum features to obtain first speech features.

Figure 9A:
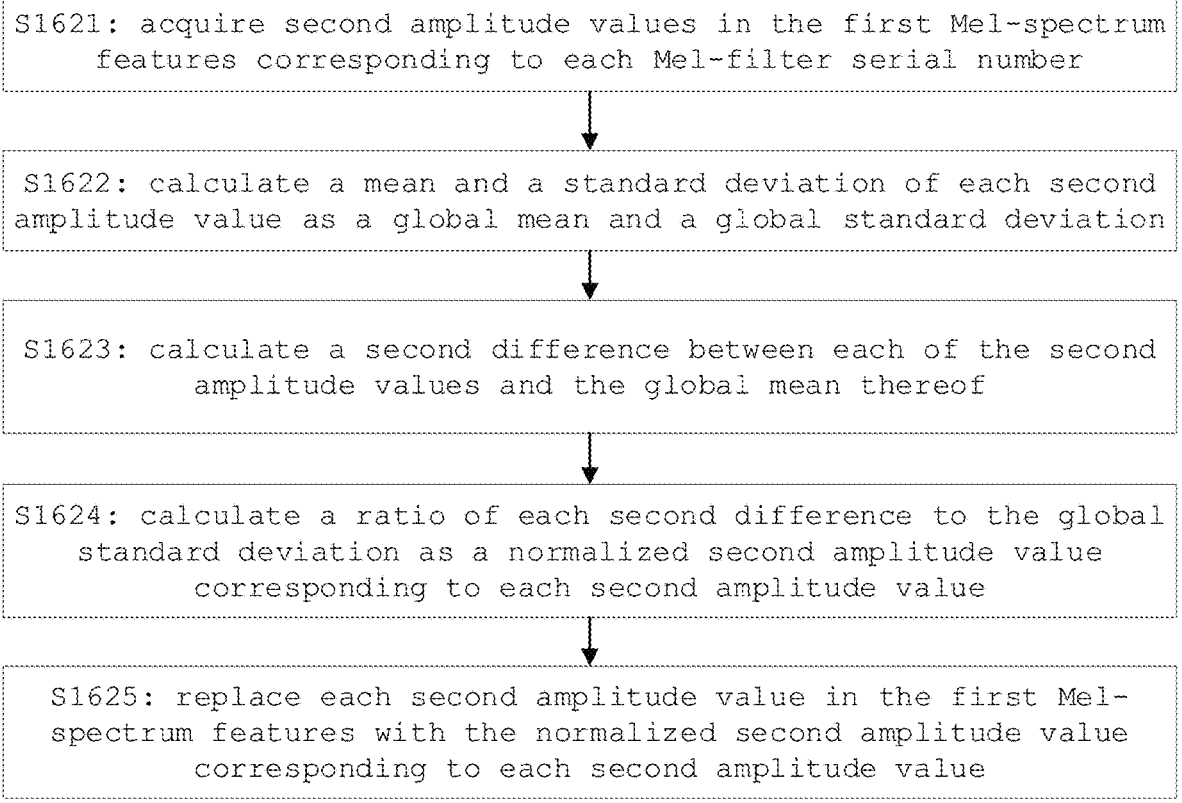
FIG. 9A is a flow diagram illustrating global normalization processing according to some embodiments of the present disclosure.

FIG. 9A is a flow diagram illustrating global normalization processing according to some embodiments of the present disclosure.

As shown in FIG. 9A, the global normalization processing comprises steps S1621 to S1625.

In step S1621, second amplitude values in the first Mel-spectrum features corresponding to each Mel-filter serial number is acquired. For example, taking the maximum sampling rate of 16 kHZ as an example, a matrix of the second amplitude values of the first Mel-spectrum feature in FIG. 8 is $\Phi_j^2$.

In the step S1622, a mean and a standard deviation of the second amplitude values are calculated as a global mean and a global standard deviation. For example, taking the maximum sampling rate of 16 kHZ as an example, a global mean and a global standard deviation corresponding to the first Mel-spectrum feature in FIG. 8 are $\overline{\Phi}_j^2$ and $\sigma(\Phi_j^2)$, respectively.

In the step S1623, a second difference between each of the second amplitude values and the global mean thereof is calculated. For example, taking the maximum sampling rate of 16 kHZ as an example, a second difference corresponding to the first Mel-spectrum feature in FIG. 8 is $\Phi_j^2 - \overline{\Phi}_j^2$.

In the step S1624, a ratio of each second difference to the global standard deviation is calculated as a normalized second amplitude value corresponding to each second amplitude value. For example, taking the maximum sampling rate of 16 kHZ as an example, a matrix of normalized second amplitude values corresponding to the matrix $\Phi_j^2$ of the second amplitude values of the first Mel-spectrum feature in FIG. 8 is $$\Omega_j^2 = \frac{\Phi_j^2 - \overline{\Phi}_j^2}{\sigma(\Phi_j^2)}.$$

Figure 9B:
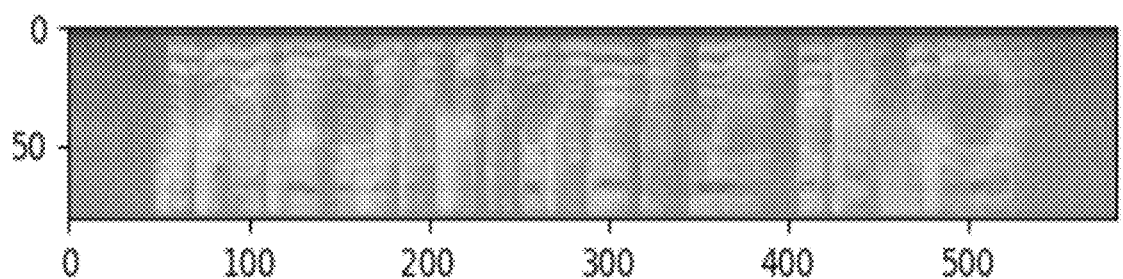
FIG. 9B illustrates a first speech feature corresponding to a to-be-trained audio with a sampling rate of 16 kHZ according to some embodiments of the present disclosure.

In the step S1625, each second amplitude value in the first Mel-spectrum features is replaced with the normalized second amplitude value corresponding to each second amplitude value. For example, taking the maximum sampling rate of 16 kHZ as an example, by using $\Omega_j^2$, the second amplitude values of the first Mel-spectrum feature in FIG. 8 are replaced with the normalized second amplitude values, to obtain a first speech feature as shown in FIG. 9B. The first Mel-spectrum features after the global normalization processing is the first speech features.

FIG. 9B illustrates a first speech feature corresponding to a to-be-trained audio with a sampling rate of 16 kHZ according to some embodiments of the present disclosure.

As shown in FIG. 9B, an abscissa of the first speech feature is a spectrum-sequence serial number, which is the same as the spectrum-sequence serial number of the first linear spectrum corresponding to the to-be-trained audio of 16 kHZ. An ordinate thereof is a Mel-filter serial number. A value of a coordinate point determined by the abscissa and the ordinate is the second amplitude value after the global normalization corresponding to the to-be-trained audio with the sampling rate of 16 kHZ.

In the present disclosure, by performing global normalization processing on the first Mel-spectrum feature, the convergence effect of the training of the machine learning model is improved, and the influence of singular data on the training of the machine learning model is suppressed.

Returning to FIG. 1, after the first speech features of the to-be-trained audios with the maximum sampling rate is determined, step S170 is executed. It should be understood that the order of executing the step S160 and the step S170 can be set as needed, and the execution order shown in FIG. 1 is only an illustration.

In the step S170, second speech features of the to-be-trained audios with the other sampling rate is determined according to second Mel-spectrum features of the second linear spectrums corresponding to the other sampling rate.

Figures 10, 11:
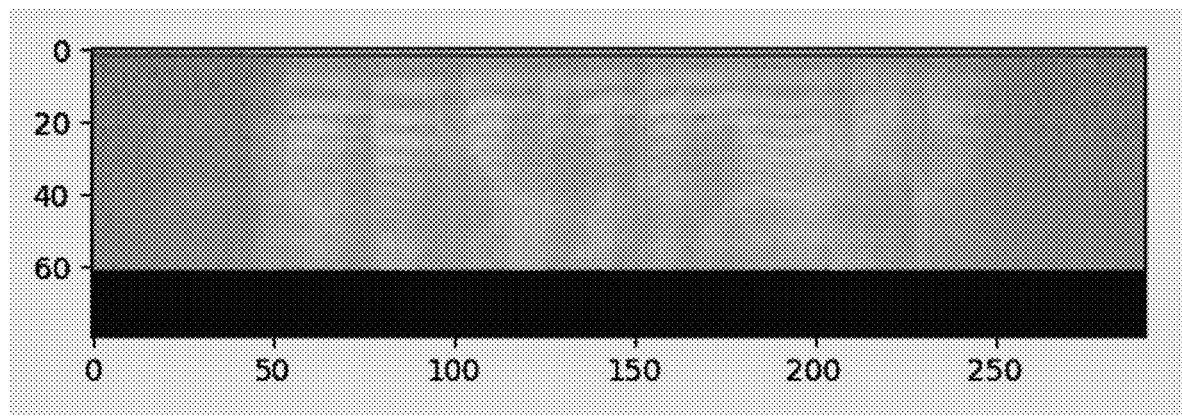
FIG. 10 is a flow diagram illustrating determining second speech features of a to-be-trained audios with other sampling rate according to some embodiments of the present disclosure.
FIG. 11 illustrates a second Mel-spectrum feature of a second linear spectrum corresponding to 8 kHZ according to some embodiments of the present disclosure.

FIG. 10 is a flow diagram illustrating determining second speech features of a to-be-trained audios with other sampling rate according to some embodiments of the present disclosure.

As shown in FIG. 10, the determining second speech features of a to-be-trained audios with another sampling rate comprises steps S171 to S172.

In the step S171, Mel-filtering transform is performed on the second linear spectrums corresponding to the other sampling rate by using a plurality of unit triangle filters or a plurality of unit square-wave filters, to obtain the second Mel-spectrum features.

For example, for the to-be-trained audio with the sampling rate of 8 kHZ, after the unit triangle filters $H_n[g]$ are calculated, the Mel-filtering transform is performed on the second linear spectrum as shown in FIG. 6 by using the 80 unit triangle filters, $H_1[g]$ to $H_n[g]$. For example, a second Mel-spectrum feature as shown in FIG. 11 is calculated by using a Mel-filtering transform formula $\Phi_i^1 = L_i^1 \times [H_1(g), \ldots, H_n[g]]$. $\Phi_i^1$ is a matrix of first amplitude values in the second Mel-spectrum feature.

FIG. 11 illustrates a second Mel-spectrum feature of a second linear spectrum corresponding to 8 kHZ according to some embodiments of the present disclosure.

As shown in FIG. 11, an abscissa of the second Mel-spectrum feature of the second linear spectrum corresponding to the to-be-trained audio with the sampling rate of 8 kHZ is a spectrum-sequence serial number, which is the same as the spectrum-sequence serial number of the second linear spectrum. An ordinate thereof is a Mel-filter serial number. A value of a coordinate point determined by the abscissa and the ordinate is a first amplitude value corresponding to the to-be-trained audio with the sampling rate of 8 kHZ.

Returning to FIG. 10, after the second Mel-spectrum features is obtained, step S172 is executed. In the step S172, local normalization processing is performed on the second Mel-spectrum features to obtain the second speech features.

FIG. 12A is a flow diagram illustrating local normalization processing according to some embodiments of the present disclosure.

As shown in FIG. 12A, the local normalization processing comprises step S1721 to step S1727.

In the step S1721, according to a maximum linear-spectrum frequency corresponding to the audios of the other sampling rate, a Mel-spectrum frequency corresponding to the maximum linear-spectrum frequency is acquired. The maximum linear-spectrum frequency is also a maximum speech signal frequency.

For example, taking the other sampling rate of 8 kHZ as an example, according to the sampling theorem, a maximum linear-spectrum frequency of the second linear spectrum corresponding to the to-be-trained audio with the sampling rate of 8 kHZ is 4 kHZ.

In the step S1722, a maximum Mel-spectrum-filter serial number corresponding to the Mel-spectrum frequency is calculated. For example, taking the other sampling rate of 8 kHZ as an example, the Mel-spectrum frequency corresponding to 4 kHZ is $$m^1 = 2595 \times \log_{10}\left(1 + \frac{4000}{700}\right) = 2146.$$

According to a formula $$m_n = \frac{m_c}{2} + m_c \times (n-1) = 17.75 + 35.5 \times (n-1),$$

the Mel-filter serial number corresponding to the Mel-spectrum frequency $m^1$ is $$n^1 = \left\lceil \frac{(m^1 - 17.75)}{35.5} + 1 \right\rceil = 61.$$

In the step S1723, first amplitude values in the second Mel-spectrum features corresponding to each other Mel-filter serial number is acquired. The other Mel-filter serial number is a Mel-filter serial number that is less than or equal to the maximum Mel-filter serial number.

For example, taking the other sampling rate of 8 kHZ as an example, the other Mel-filter serial numbers are 1 to 61. In some embodiments, a matrix of first amplitude values corresponding to the other Mel-filter serial numbers of the second Mel-spectrum feature in FIG. 11 is $\Phi_i^1[:61]$.

In the step S1724, a mean and a standard deviation of the first amplitude values are respectively calculated as a local mean and a local standard deviation. For example, taking the other sampling rate of 8 kHZ as an example, a local mean and a local standard deviation corresponding to the second Mel-spectrum feature in FIG. 11 are $\overline{\Phi}_i^1[:61]$ and $\sigma(\Phi_i^1[:61])$, respectively.

In the step S1725, a first difference between each of the first amplitude values and the local mean thereof is calculated. For example, taking the other sampling rate of 8 kHZ as an example, a first difference corresponding to the second Mel-spectrum feature in FIG. 11 is $\Phi_i^1[:61]-\overline{\Phi}_i^1[:61]$.

In the step S1726, a ratio of each first difference to the local standard deviation is calculated as a normalized first amplitude value corresponding to each first amplitude value. For example, taking the other sampling rate of 8 kHZ as an example, the matrix of the first amplitude values corresponding to the other Mel-filter serial numbers in the second Mel-spectrum feature in FIG. 11 is $\Phi_i^1[:61]$, and a corresponding matrix of normalized first amplitude values is $$\Omega_i^1[:61] = \frac{\Phi_i^1[:61] - \overline{\Phi}_i^1[:61]}{\sigma(\Phi_i^1[:61])}.$$

In the step S1727, each first amplitude value in the second Mel-spectrum features is replaced with the normalized first amplitude value corresponding to each first amplitude value.

Figure 12B:
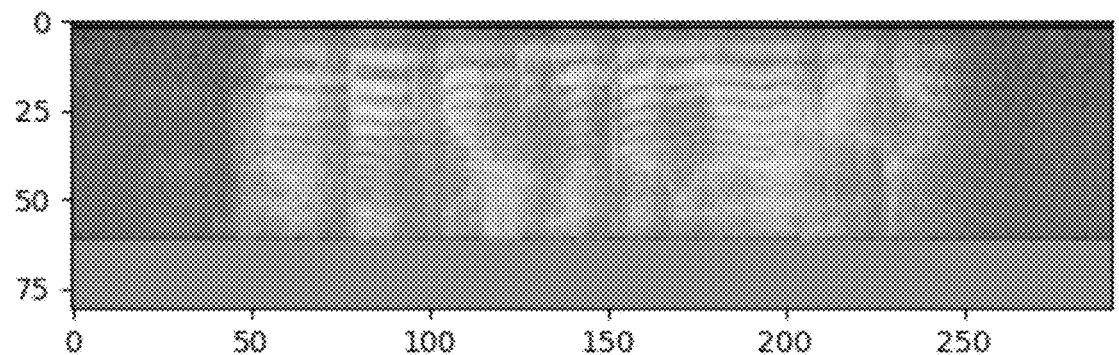
FIG. 12B illustrates a second speech feature corresponding to a to-be-trained audio with a sampling rate of 8 kHZ according to some embodiments of the present disclosure.

For example, taking the other sampling rate of 8 kHZ as an example, by using $\Omega_i^1[:61]$, the first amplitude values corresponding to the other Mel-filter serial numbers in the second Mel-spectrum feature of FIG. 11 are replaced with the normalized first amplitude values, to obtain the second speech feature as shown in FIG. 12B.

For the second Mel-spectrum feature of FIG. 11, whose other 19 dimensions than 1st to 61st dimensions are formed by zero-padding, the first amplitude values remain unchanged. For example, $\Omega_i^1[62:]=\Phi_i^1[62:]$. $\Omega_i^1[62:]$ is a matrix of first amplitude values of a second Mel-spectrum feature from 62nd to 80th dimensions. $\Omega_i^1[62:]$ is a matrix of first amplitude values of a second Mel-spectrum feature of the 19 dimensions, namely, 62nd to 80th dimensions, after the local normalization processing.

FIG. 12B illustrates a second speech feature corresponding to a to-be-trained audio with a sampling rate of 8 kHZ according to some embodiments of the present disclosure.

As shown in FIG. 12B, an abscissa of the second speech feature is a spectrum-sequence serial number, which is the same as the spectrum-sequence serial number of the second linear spectrum. An ordinate is a Mel-filter serial number. A value of a coordinate point determined by the abscissa and the ordinate is a first amplitude value after the local normalization corresponding to the to-be-trained audio with the sampling rate of 8 kHZ.

Since the high-frequency zero-padding is performed on the first linear spectrum of the to-be-trained audio with the other sampling rate in the step S150 as shown in FIG. 1, in the present disclosure, by performing the local normalization processing on the second Mel-spectrum feature, the problem of suppressing the original speech feature of the to-be-trained audio, which is caused by the normalization processing on a feature having a large number of means and standard deviations of 0 that are brought by zero-padding the second Mel-spectrum feature, is effectively avoided, and the original speech feature of the to-be-trained audio can be better prevented from being suppressed. The high frequency here refers to a linear-spectrum frequency corresponding to a frequency-domain serial number that is greater than the first frequency-domain serial number and less than or equal to the second frequency-domain serial number.

Returning to FIG. 1, after the first speech features and the second speech features are determined, step S180 is executed. In the step S180, a machine learning model is trained by using the first speech features and the second speech features. In some embodiments, the machine learning model comprises a DNN (Deep Neural Network) model. For example, the DNN model is an end-to-end-based DNN model.

For example, taking the different sampling rates of 8 kHZ and 16 kHZ as examples, a machine learning model is trained by using the first speech feature as shown in FIG. 9B and the second speech feature as shown in FIG. 12B.

It should be understood that, in the above embodiments, FIGS. 5A to 6, FIG. 8, FIG. 11, FIG. 9B, and FIG. 12B are schematic diagrams only, in which the magnitude of the amplitude value is decided by luminance.

In some embodiments, after the machine learning model has been trained, speech recognition on the to-be-recognized audio can also be performed by using the machine learning model.

The speech recognition on the to-be-recognized audio by using the machine learning model is implemented, for example, in the following ways.

First, the to-be-recognized audio is acquired. For example, the to-be-recognized audio is one of the different sampling rates.

Then, a speech feature of the to-be-recognized audio is determined.

In some embodiments, first, a maximum frequency-domain serial number of a first linear spectrum of the to-be-recognized audio is determined as a third frequency-domain serial number. Then, amplitude values corresponding to each frequency-domain serial number that is greater than the third frequency-domain serial number and less than or equal to a second frequency-domain serial number in the first linear spectrum of the to-be-recognized audio are set to zero, to obtain a second linear spectrum of the to-be-recognized audio. Finally, the speech feature of the to-be-recognized audio is determined according to a Mel-spectrum feature of the second linear spectrum of the to-be-recognized audio.

It should be understood that in the speech recognition process, it is also needed to obtain the speech feature of the to-be-recognized audio by using a method similar to the method of obtaining the speech feature of the to-be-trained audio, so as to perform speech recognition by using the speech feature of the to-be-recognized audio.

Finally, the speech feature of the to-be-recognized audio is inputted into the machine learning model, to obtain a speech recognition result. For example, the to-be-recognized audio is transformed into text information, and the text information is the speech recognition result.

In the present disclosure, by means of zero-padding on the first linear spectrum corresponding to the to-be-trained audio with the other sampling rate less than the maximum sampling rate, the effect of performing mixed training on the to-be-trained audios with the different sampling rates is achieved on the basis of neither adding nor reducing the speech features, the original speech features of the audio data with the different sampling rates can be extracted more accurately, and therefore the recognition performance of the machine learning model is improved. Compared with a manner of training the machine learning model by using audios with a single sampling rate, in the present disclosure, the problem of insufficient training samples caused by the limited number of the audios with the single sampling rate is solved, the problem of poor universality of the machine learning model, which is caused by poor speech recognition effect on audio data with another sampling rate by the machine learning model trained by using the audio data with the single sampling rate, is solved, which improves the universality of the machine learning model.

Figure 13:
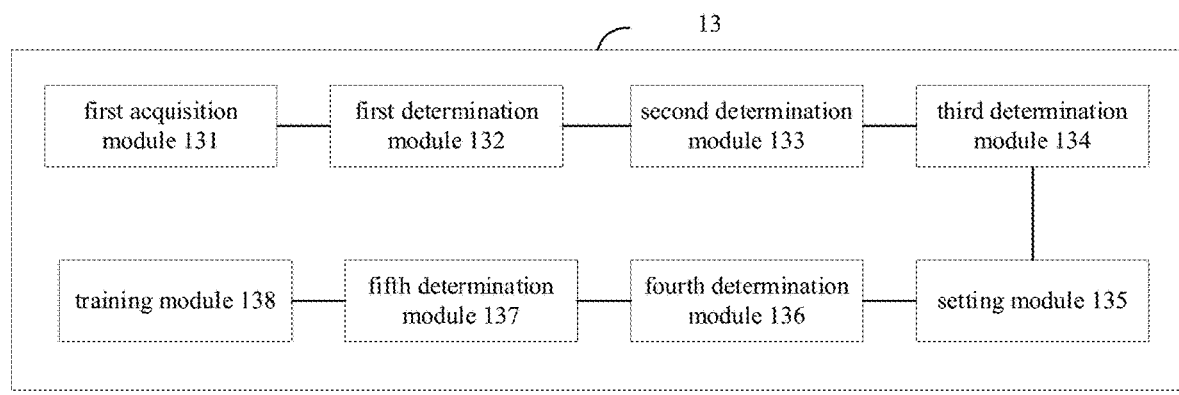
FIG. 13 is a block diagram illustrating a speech recognition apparatus according to some embodiments of the present disclosure.

FIG. 13 is a block diagram illustrating a speech recognition apparatus according to some embodiments of the present disclosure.

As shown in FIG. 13, a speech recognition apparatus 13 comprises a first acquisition module 131, a first determination module 132, a second determination module 133, a third determination module 134, a setting module 135, a fourth determination module 136, a fifth determination module 137, and a training module 138.

The first obtaining module 131 is configured to acquire first linear spectrums corresponding to to-be-trained audios with different sampling rates, wherein an abscissa of the first linear spectrums is a spectrum-sequence serial number, an ordinate of the first linear spectrum is a frequency-domain serial number, and a value of a coordinate point determined by the abscissa and the ordinate is an original amplitude value corresponding to the to-be-trained audios, for example, to perform the step S110 as shown in FIG. 1.

The first determination module 132 is configured to determine a maximum sampling rate and other sampling rate than the maximum sampling rate in the different sampling rates, for example, to perform the step S120 as shown in FIG. 1.

The second determination module 133 is configured to determine a maximum frequency-domain serial number of the first linear spectrums corresponding to the other sampling rate as a first frequency-domain serial number, for example, to perform the step S130 shown in FIG. 1.

The third determination module 134 is configured to determine a maximum frequency-domain serial number of the first linear spectrums corresponding to the maximum sampling rate as a second frequency-domain serial number, for example, to perform the step S140 shown in FIG. 1.

The setting module 135 is configured to set, to zero, amplitude values corresponding to each frequency-domain serial number that is greater than the first frequency-domain serial number and less than or equal to the second frequency-domain serial number in the first linear spectrums corresponding to the other sampling rate, to obtain second linear spectrums corresponding to the other sampling rate, for example, to perform the step S150 shown in FIG. 1.

The fourth determination module 136 is configured to determine first speech features of the to-be-trained audios with the maximum sampling rate according to first Mel-spectrum features of the first linear spectrums corresponding to the maximum sampling rate, for example, to perform the step S160 as shown in FIG. 1.

The fifth determination module 137 is configured to determine second speech features of the to-be-trained audios with the other sampling rate according to second Mel-spectrum features of the second linear spectrums corresponding to the other sampling rate, for example, to perform the step S170 shown in FIG. 1.

The training module 138 is configured to train a machine learning model by using the first speech features and the second speech features, for example, to perform the step S180 as shown in FIG. 1.

Figure 14:
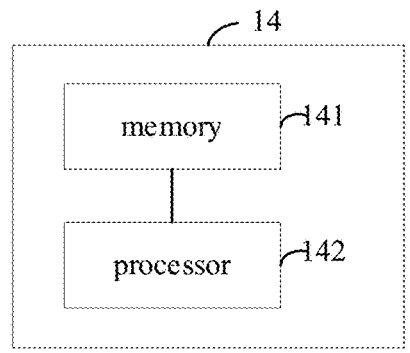
FIG. 14 is a block diagram illustrating a speech recognition apparatus according to other embodiments of the present disclosure.

FIG. 14 is a block diagram illustrating a speech recognition apparatus according to other embodiments of the present disclosure.

As shown in FIG. 14, a speech recognition apparatus 14 comprises a memory 141; and a processor 142 coupled to the memory 141. The memory 141 is configured to store instructions for performing the corresponding embodiments of the speech recognition method. The processor 142 is configured to perform, based on the instructions stored in the memory 141, the speech recognition method in any embodiments of the present disclosure.

Figure 15:
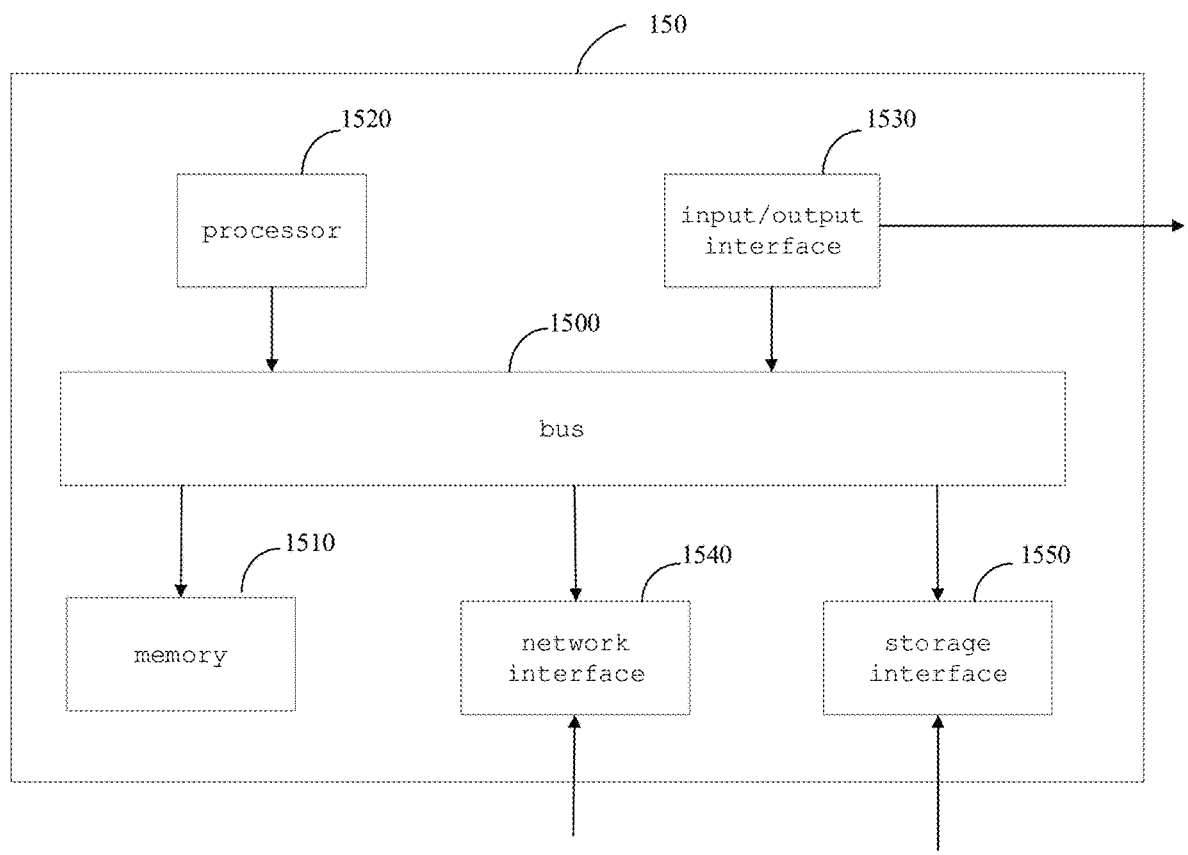
FIG. 15 is a block diagram illustrating a computer system for implementing some embodiments of the present disclosure.

FIG. 15 is a block diagram illustrating a computer system for implementing some embodiments of the present disclosure.

As shown in FIG. 15, a computer system 150 can take a form of a general-purpose computing device. The computer system 150 comprises a memory 1510, a processor 1520, and a bus 1500 connecting different system components.

The memory 1510 can include, for example, a system memory, a non-volatile storage medium, and the like. The system memory, for example, has thereon stored an operating system, an application program, a boot loader, other programs, and the like. The system memory can include a volatile storage medium, such as a random access memory (RAM) and/or cache memory. The non-volatile storage medium, for example, has thereon stored instructions to perform a corresponding embodiment of at least one of the speech recognition methods. The non-volatile storage medium includes, but is not limited to, a magnetic-disk memory, optical memory, flash memory, and the like.

The processor 1520 can be implemented by means of discrete hardware components, such as a general-purpose processor, a digital signal processor (DSP), an application specific integrated circuit (ASIC), a field programmable gate array (FPGA) or other programmable logic device, a discrete gate or transistor, and the like. Accordingly, each module such as the judgment module and the determination module can be implemented by running, by a central processing unit (CPU), instructions in a memory performing the corresponding steps, or can be implemented by a dedicated circuit performing the corresponding steps.

The bus 1500 can use any of a variety of bus architectures. For example, the bus architectures include, but are not limited to, an industry standard architecture (ISA) bus, a micro channel architecture (MCA) bus, and a peripheral component interconnect (PCI) bus.

The computer system 150 can also include an input/output interface 1530, a network interface 1540, a storage interface 1550, and the like. These interfaces 1530, 1540, 1550, and the memory 1510 and the processor 1520 can be connected through the bus 1500. The input/output interface 1530 can provide a connection interface for input/output devices such as a display, a mouse, a keyboard, and the like. The network interface 1540 provides a connection interface for a variety of networking devices. The storage interface 1550 provides a connection interface for external storage devices such as a floppy disk, a USB disk, an SD card, and the like.

Various aspects of the present disclosure have been described herein with reference to flow diagrams and/or block diagrams of methods, apparatuses and computer program products according to embodiments of the present disclosure. It should be understood that each block of the flow diagrams and/or block diagrams, and combinations of blocks, can be implemented by computer-readable program instructions.

These computer-readable program instructions can be provided to a processor of a general-purpose computer, special-purpose computer, or other programmable apparatus, to generate a machine, such that an apparatus for implementing functions specified in one or more blocks in the flow diagrams and/or block diagrams is generated by executing the instructions by the processor.

These computer-readable program instructions can also be stored in a computer-readable memory, and cause a computer to operate in a specific manner to produce an article of manufacture that comprises instructions implementing function specified in one or more blocks in the flow diagrams and/or block diagrams.

The present disclosure can take a form of an entire hardware embodiment, an entire software embodiment or an embodiment combining software and hardware aspects.

By the speech recognition method and apparatus and the non-transitory computer-storable medium in the above embodiment, the original speech features of the audio data with the different sampling rates can be accurately extracted, thereby improving the speech recognition performance of the machine learning model.

So far, the speech recognition method and apparatus and non-transitory computer-storable medium according to the present disclosure have been described in detail. Some details well known in the art have not been described in order to avoid obscuring the concepts of the present disclosure. Those skilled in the art can fully appreciate how to implement the technical solutions disclosed herein, in view of the foregoing description.

What is claimed is:

1. A speech recognition method, comprising:
   acquiring first linear spectrums corresponding to to-be-trained audios with different sampling rates, wherein an abscissa of the first linear spectrums is a spectrum-sequence serial number, an ordinate of the first linear spectrums is a frequency-domain serial number, and a value of a coordinate point determined by the abscissa and the ordinate is an original amplitude value corresponding to the to-be-trained audios;
   determining a maximum sampling rate and other sampling rate than the maximum sampling rate in the different sampling rates;
   determining a maximum frequency-domain serial number of the first linear spectrums corresponding to the other sampling rate as a first frequency-domain serial number;
   determining a maximum frequency-domain serial number of the first linear spectrums corresponding to the maximum sampling rate as a second frequency-domain serial number;
   setting, to zero, amplitude values corresponding to each frequency-domain serial number that is greater than the first frequency-domain serial number and less than or equal to the second frequency-domain serial number, in the first linear spectrums corresponding to the other sampling rate, to obtain second linear spectrums corresponding to the other sampling rate;
   determining first speech features of the to-be-trained audios with the maximum sampling rate according to first Mel-spectrum features of the first linear spectrums corresponding to the maximum sampling rate;
   determining second speech features of the to-be-trained audios with the other sampling rate according to second Mel-spectrum features of the second linear spectrums corresponding to the other sampling rate; and
   training a machine learning model by using the first speech features and the second speech features,
   wherein the determining second speech features of the to-be-trained audios with the other sampling rate comprises performing local normalization processing on the second Mel-spectrum features to obtain the second speech features and the local normalization processing comprises:
   according to a maximum linear-spectrum frequency corresponding to the to-be-trained audios with the other sampling rate, acquiring a Mel-spectrum frequency corresponding to the maximum linear-spectrum frequency;
   calculating a maximum Mel-filter serial number corresponding to the Mel-spectrum frequency;
   acquiring first amplitude values corresponding to each other Mel-filter serial number in the second Mel-spectrum features, the other Mel-filter serial number being a Mel-filter serial number less than or equal to the maximum Mel-filter serial number;
   respectively calculating a mean and a standard deviation of all first amplitude values as a local mean and a local standard deviation;
   calculating a first difference between each of the first amplitude values and the local mean thereof;
   calculating a ratio of each first difference to the local standard deviation as a normalized first amplitude value corresponding to each first amplitude value; and
   replacing each first amplitude value in the second Mel-spectrum features with the normalized first amplitude value corresponding to each first amplitude value.

2. A speech recognition method, comprising:
   acquiring first linear spectrums corresponding to to-be-trained audios with different sampling rates, wherein an abscissa of the first linear spectrums is a spectrum-sequence serial number, an ordinate of the first linear spectrums is a frequency-domain serial number, and a value of a coordinate point determined by the abscissa and the ordinate is an original amplitude value corresponding to the to-be-trained audios;
   determining a maximum sampling rate and other sampling rate than the maximum sampling rate in the different sampling rates;
   determining a maximum frequency-domain serial number of the first linear spectrums corresponding to the other sampling rate as a first frequency-domain serial number;
   determining a maximum frequency-domain serial number of the first linear spectrums corresponding to the maximum sampling rate as a second frequency-domain serial number;
   setting, to zero, amplitude values corresponding to each frequency-domain serial number that is greater than the first frequency-domain serial number and less than or equal to the second frequency-domain serial number, in the first linear spectrums corresponding to the other sampling rate, to obtain second linear spectrums corresponding to the other sampling rate;
   determining first speech features of the to-be-trained audios with the maximum sampling rate according to first Mel-spectrum features of the first linear spectrums corresponding to the maximum sampling rate;
   determining second speech features of the to-be-trained audios with the other sampling rate according to second Mel-spectrum features of the second linear spectrums corresponding to the other sampling rate; and
   training a machine learning model by using the first speech features and the second speech features, wherein the determining first speech features of the to-be-trained audios with the maximum sampling rate comprises performing global normalization processing on the first Mel-spectrum features to obtain the first speech features and the global normalization processing comprises:
acquiring second amplitude values corresponding to each Mel-filter serial number in the first Mel-spectrum features;
calculating a mean and a standard deviation of all second amplitude values as a global mean and a global standard deviation;
calculating a second difference between each of the second amplitude values and the global mean thereof;
calculating a ratio of each second difference to the global standard deviation as a normalized second amplitude value corresponding to each second amplitude value; and
replacing each second amplitude value in the first Mel-spectrum features with the normalized second amplitude value corresponding to each second amplitude value.

3. The speech recognition method according to claim 1, wherein the acquiring first linear spectrums corresponding to to-be-trained audios with different sampling rates comprises:
respectively acquiring the first linear spectrums corresponding to the to-be-trained audios with the different sampling rates by using short-time Fourier transform.

4. The speech recognition method according to claim 1, wherein the acquiring first linear spectrums corresponding to to-be-trained audios with different sampling rates comprises:
acquiring speech signal oscillograms of the to-be-trained audios with the different sampling rates;
respectively performing pre-emphasis processing on the speech signal oscillograms of the to-be-trained audios with the different sampling rates; and
acquiring the first linear spectrums corresponding to the to-be-trained audios with the different sampling rates according to the speech signal oscillograms after the pre-emphasis processing.

5. The speech recognition method according to claim 1, further comprising:
respectively performing Mel-filtering transform on the first linear spectrums corresponding to the maximum sampling rate and the second linear spectrums corresponding to the other sampling rate by using a plurality of unit triangle filters, to obtain the first Mel-spectrum features and the second Mel-spectrum features.

6. The speech recognition method according to claim 1, wherein the machine learning model comprises a deep neural network (DNN) model.

7. The speech recognition method according to claim 1, wherein the different sampling rates comprise 16 kHZ and 8 kHZ.

8. The speech recognition method according to claim 1, further comprising:
acquiring a to-be-recognized audio;
determining a speech feature of the to-be-recognized audio; and
inputting the speech feature of the to-be-recognized audio into the machine learning model, to obtain a speech recognition result.

9. The speech recognition method according to claim 8, wherein the determining a speech feature of the to-be-recognized audio comprises:

determining a maximum frequency-domain serial number of a first linear spectrum of the to-be-recognized audio as a third frequency-domain serial number;
setting, to zero, amplitude values corresponding to each frequency-domain serial number that is greater than the third frequency-domain serial number and less than or equal to the second frequency-domain serial number in the first linear spectrum of the to-be-recognized audio, to obtain a second linear spectrum of the to-be-recognized audio; and
determining the speech feature of the to-be-recognized audio according to a Mel-spectrum feature of the second linear spectrum of the to-be-recognized audio.

10. A speech recognition apparatus, comprising:
a memory; and
a processor coupled to the memory, which is configured to executed the speech recognition method according to claim 1.

11. A speech recognition apparatus, comprising:
a memory; and
a processor coupled to the memory, which is configured to executed the speech recognition method according to claim 2.

12. A non-transitory computer-storable medium having stored thereon computer program instructions which, when executed by a processor, implement a speech recognition method, which comprises:
acquiring first linear spectrums corresponding to to-be-trained audios with different sampling rates, wherein an abscissa of the first linear spectrums is a spectrum-sequence serial number, an ordinate of the first linear spectrums is a frequency-domain serial number, and a value of a coordinate point determined by the abscissa and the ordinate is an original amplitude value corresponding to the to-be-trained audios;
determining a maximum sampling rate and other sampling rate than the maximum sampling rate in the different sampling rates;
determining a maximum frequency-domain serial number of the first linear spectrums corresponding to the other sampling rate as a first frequency-domain serial number;
determining a maximum frequency-domain serial number of the first linear spectrums corresponding to the maximum sampling rate as a second frequency-domain serial number;
setting, to zero, amplitude values corresponding to each frequency-domain serial number that is greater than the first frequency-domain serial number and less than or equal to the second frequency-domain serial number, in the first linear spectrums corresponding to the other sampling rate, to obtain second linear spectrums corresponding to the other sampling rate;
determining first speech features of the to-be-trained audios with the maximum sampling rate according to first Mel-spectrum features of the first linear spectrums corresponding to the maximum sampling rate;
determining second speech features of the to-be-trained audios with the other sampling rate according to second Mel-spectrum features of the second linear spectrums corresponding to the other sampling rate; and
training a machine learning model by using the first speech features and the second speech features,
wherein the determining second speech features of the to-be-trained audios with the other sampling rate comprises performing local normalization processing on the second Mel-spectrum features to obtain the second speech features and the local normalization processing comprises:

according to a maximum linear-spectrum frequency corresponding to the to-be-trained audios with the other sampling rate, acquiring a Mel-spectrum frequency corresponding to the maximum linear-spectrum frequency;

calculating a maximum Mel-filter serial number corresponding to the Mel-spectrum frequency;

acquiring first amplitude values corresponding to each other Mel-filter serial number in the second Mel-spectrum features, the other Mel-filter serial number being a Mel-filter serial number less than or equal to the maximum Mel-filter serial number;

respectively calculating a mean and a standard deviation of all first amplitude values as a local mean and a local standard deviation;

calculating a first difference between each of the first amplitude values and the local mean thereof;

calculating a ratio of each first difference to the local standard deviation as a normalized first amplitude value corresponding to each first amplitude value; and replacing each first amplitude value in the second Mel-spectrum features with the normalized first amplitude value corresponding to each first amplitude value.

13. A non-transitory computer-storable medium having stored thereon computer program instructions which, when executed by a processor, implement the speech recognition method according to claim 2.

14. The speech recognition method according to claim 2, wherein the acquiring first linear spectrums corresponding to to-be-trained audios with different sampling rates comprises:

respectively acquiring the first linear spectrums corresponding to the to-be-trained audios with the different sampling rates by using short-time Fourier transform.

15. The speech recognition method according to claim 2, wherein the acquiring first linear spectrums corresponding to to-be-trained audios with different sampling rates comprises:

acquiring speech signal oscillograms of the to-be-trained audios with the different sampling rates;

respectively performing pre-emphasis processing on the speech signal oscillograms of the to-be-trained audios with the different sampling rates; and acquiring the first linear spectrums corresponding to the to-be-trained audios with the different sampling rates according to the speech signal oscillograms after the pre-emphasis processing.

16. The speech recognition method according to claim 2, further comprising:

respectively performing Mel-filtering transform on the first linear spectrums corresponding to the maximum sampling rate and the second linear spectrums corresponding to the other sampling rate by using a plurality of unit triangle filters, to obtain the first Mel-spectrum features and the second Mel-spectrum features.

17. The speech recognition method according to claim 2, wherein the machine learning model comprises a deep neural network (DNN) model.

18. The speech recognition method according to claim 2, wherein the different sampling rates comprise 16 kHZ and 8 kHZ.

19. The speech recognition method according to claim 2, further comprising:

acquiring a to-be-recognized audio;

determining a speech feature of the to-be-recognized audio; and inputting the speech feature of the to-be-recognized audio into the machine learning model, to obtain a speech recognition result.

20. The speech recognition method according to claim 19, wherein the determining a speech feature of the to-be-recognized audio comprises:

determining a maximum frequency-domain serial number of a first linear spectrum of the to-be-recognized audio as a third frequency-domain serial number;

setting, to zero, amplitude values corresponding to each frequency-domain serial number that is greater than the third frequency-domain serial number and less than or equal to the second frequency-domain serial number in the first linear spectrum of the to-be-recognized audio, to obtain a second linear spectrum of the to-be-recognized audio; and determining the speech feature of the to-be-recognized audio according to a Mel-spectrum feature of the second linear spectrum of the to-be-recognized audio.

* * * * *

UNITED STATES PATENT AND TRADEMARK OFFICE
CERTIFICATE OF CORRECTION

PATENT NO. : 12,217,739 B2
APPLICATION NO. : 17/760609
DATED : February 4, 2025
INVENTOR(S) : Li Fu Page 1 of 1

It is certified that error appears in the above-identified patent and that said Letters Patent is hereby corrected as shown below:

In the Claims

Column 24, Lines 17-18, Claim 10: Please correct "configured to executed" to read --configured to execute--

Column 24, Lines 22-23, Claim 11: Please correct "configured to executed" to read --configured to execute--

Signed and Sealed this
Twenty-fourth Day of June, 2025

Coke Morgan Stewart
*Acting Director of the United States Patent and Trademark Office*